United States Patent
Harrison, III (12)

(10) Patent No.: US 10,606,741 B2
(45) Date of Patent: Mar. 31, 2020

(54) PROCESS FOR BUDDY ALLOCATION

(71) Applicant: Williams Ludwell Harrison, III, San Diego, CA (US)

(72) Inventor: Williams Ludwell Harrison, III, San Diego, CA (US)

(73) Assignee: AIR Technology Holdings Limited, Central (HK)

( * ) Notice: Subject to any disclaimer, the term of this patent is extended or adjusted under 35 U.S.C. 154(b) by 23 days.

(21) Appl. No.: 15/984,805

(22) Filed: May 21, 2018

(65) Prior Publication Data

US 2018/0267892 A1    Sep. 20, 2018

(51) Int. Cl.
*G06F 12/00* (2006.01)
*G06F 12/02* (2006.01)
*G06F 3/06* (2006.01)

(52) U.S. Cl.
CPC .......... *G06F 12/023* (2013.01); *G06F 3/0608* (2013.01); *G06F 3/0631* (2013.01); *G06F 3/0673* (2013.01); *G06F 2212/1044* (2013.01)

(58) Field of Classification Search
CPC .............................. G06F 12/023; G06F 3/0673
USPC ......................................................... 711/154
See application file for complete search history.

(56) References Cited

U.S. PATENT DOCUMENTS

2002/0144073 A1 * 10/2002 Trainin ................ G06F 12/023
                                                                711/170

* cited by examiner

*Primary Examiner* — Jae U Yu
(74) *Attorney, Agent, or Firm* — Plager Schack LLP; Mark H. Plager; Alexis J. Saenz

(57) ABSTRACT

A process improves upon the binary buddy allocation approach by salvaging memory units that are typically unused during the binary buddy technique. A free power of 2 size block of memory, retrieved in response to an allocation request, is decomposed by releasing units in power of 2 sizes until the requested size is reached. Released units are made available for subsequent allocation requests. The deallocation of a previously allocated block causes the decomposition of the block into power of 2 size sub-blocks. These sub-blocks may be merged with adjacent free blocks using the binary buddy approach now that units in power of 2 are available. The process keeps free blocks maximally coalesced, so that additional steps of defragmentation or merging are not required. A maximum size value restriction may be attached to some blocks of memory which remains preserved during any of the allocation or deallocation processes.

5 Claims, 25 Drawing Sheets

Decompose Preserves Max Size Constrains

Salvage Introduces New Max Size Constraints

Salvage Introduces New Max Size Constraints

Blocks with Reduced Max Size are Ordinary Free Blocks

Subsequent Release of Live Block 2/4 from Figure 16

Allocation Followed by Deallocation of an 11-Unit Block

PROCESS FOR BUDDY ALLOCATION

CROSS REFERENCE TO RELATED APPLICATIONS

None.

BACKGROUND

The embodiments herein relate generally to computer data storage systems and more particularly, to a process for buddy allocation without internal fragmentation.

Binary Buddy allocation is a widely used technique for allocating and deallocating memory in systems and devices that contain storage that requires dynamic allocation and deallocation. Binary Buddy allocation has a number of desirable properties. It performs a single allocation or deallocation in time proportional to $\lceil \log 2N \rceil$ where N is size of the largest block under management. It does this while requiring only $\lceil \log 2 \log 2N \rceil + 1$ bits of information to be associated with each block, where N is the size of the largest block under management by the allocator. It coalesces released blocks on the fly, which is to say that a deallocated block is coalesced with neighboring free blocks at the moment of deallocation, so that beyond the action of individual allocations and deallocations, no other processing is necessary in order to keep free blocks fully coalesced.

Binary Buddy allocation can provide for high alignment of allocations which means that it can effortlessly provide $2^{\lceil \log 2R \rceil}$ alignment for a request of R storage units, i.e., alignment at least as great as the request size, subject to the alignment of the entire memory region it is working within.

Binary Buddy allocation has a serious shortcoming however. Because it is only able to allocate and deallocate blocks whose size is a power of two, the difference between the amount of storage requested and the nearest larger power of two is wasted. This form of waste is known as internal fragmentation as the unused storage is internal to the block the allocator returns for a request and is unavailable to service other requests.

Embodiments of the disclosed invention solve these problems.

SUMMARY

In one aspect of the subject technology, a process performed by a computing device for allocating blocks of memory comprises receiving a request for a block of memory of (x) unit size; retrieving a free block of memory with a greater than or equal to (x) unit size; and successively releasing from the retrieved free block of memory, a power of 2 number of units of memory, until the retrieved free block of memory is (x) units size.

In another aspect, a process performed by a computing device for deallocating blocks of memory comprises receiving a request to deallocate a previously allocated block of memory of (x) unit size; and successively releasing decreasing power of 2 units from the previously allocated block of memory until the entire previously allocated block has been released.

In yet another aspect, process performed by a computing device for allocating and deallocating blocks of memory comprises receiving a request for a block of memory of (x) unit size; retrieving a block of memory with a greater than or equal to (x) unit size; successively releasing from the retrieved block of memory, a power of 2 number of units of memory, until the retrieved block of memory is (x) units size; associating a maximum size value with each released power of 2 number of units of memory; receiving a request to deallocate a block of memory of (y) unit size; successively releasing decreasing power of 2 units from the block of memory of (y) unit size; associating a maximum size with each power of 2 units released from the block of memory of (y) unit size; starting with the last power of 2 units released from the block of memory of (y) units size, merging the last power of 2 units with its binary buddy block to form a merged power of 2 units when the binary buddy block is free and has the same size as the released power of 2 units; associating a maximum size with each merged power of 2 units; and repeating the merging step for each merged power of 2 units, while the size of the power of 2 units has a size less than its maximum size.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
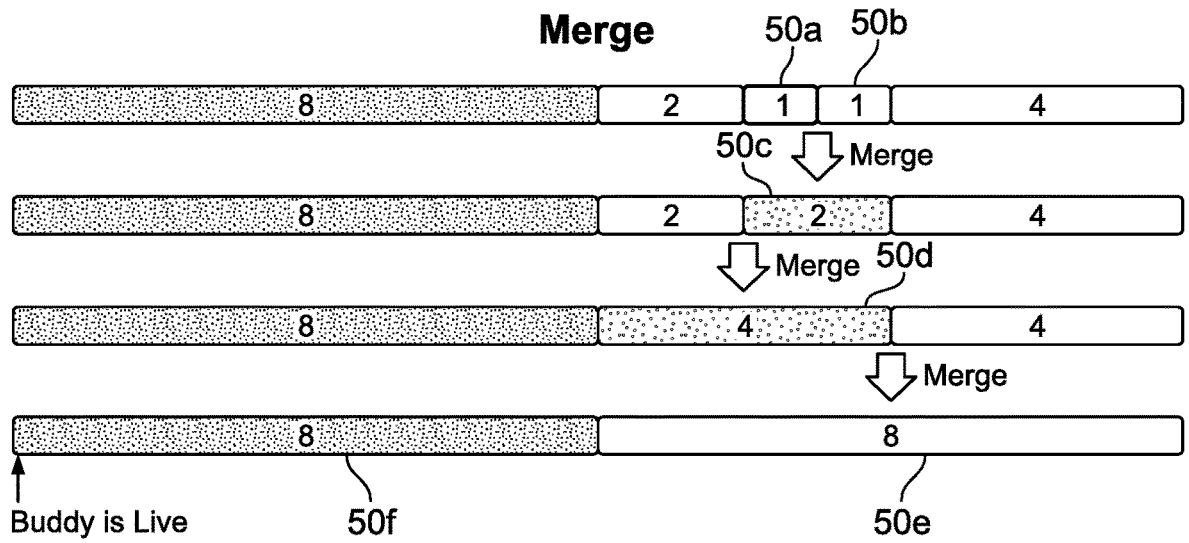
FIG. 1 is a diagrammatic view of a merge process for blocks of memory according to an embodiment of the subject disclosure.

In general, embodiments of the present disclosure eliminate internal fragmentation from binary buddy allocators in data management systems while preserving both their on-the-fly coalescing and their alignment properties. It supports a wide range of embodiments in hardware, firmware, and software. In some embodiments, bookkeeping information is held separately from the storage under management, in which case the allocator is able to achieve internal fragmentation of zero. In other embodiments, bookkeeping information is stored in the blocks under management themselves. In these embodiments internal fragmentation is bounded by a constant. The overhead for accomplishing this is an additional [log 2 log 2N] bits per block, where N is the largest block under management by the allocator. The net result is a real-time allocator that supports arbitrary request sizes, high alignment, and internal fragmentation bounded by a constant, with the same time and space bounds as the original Binary Buddy allocator.

Embodiments disclosed solve problems specific to data management in computer hardware; namely in memory storage systems organizing data for read/write activity. As will be appreciated, computer hardware performance is improved by aspects of the processes disclosed which optimize data storage space among file addresses of memory devices. Embodiments below discloses processes which improve upon the binary buddy allocation approach, which as discussed above, wastes storage space that is the difference between the amount of storage requested and the nearest larger power of two. These units become fragmentation that may not be available for use with future read/write actions. For example, if a file write request needs 17 units of memory, the conventional binary buddy system needs to request a 32-unit block of memory. As a result, 15 units (approximately 47% of the block space) potentially become wasted between file addresses.

It will be appreciated that an exemplary embodiment, (sometimes referred to as the "Salvaging Allocator"), is an improvement to the Binary Buddy allocation process. Aspects of the embodiments disclosed below salvage memory units that are typically lost or unused during the binary buddy technique. A free block of memory requested for a file action, is decomposed, releasing units of memory in power of 2 sizes until the requested size is reached. The released units may be evaluated for merging with adjacent blocks or units of memory. Merges among adjacent free blocks of memory may be performed, for example, under the binary buddy approach, now that units in power of 2 are available. In an exemplary embodiment, the process identifies which adjacent units/blocks form a next level power of 2 size block optimizing the reallocation of units to eliminate the number of fragmented and units between file addresses, which may not be useable for future read/write requests The Salvaging Allocator overcomes the aforementioned shortcomings while preserving the other desirable properties of Binary Buddy allocation, including its running time per allocation and deallocation, on-the-fly coalescing of free blocks, and alignment of requests. The Salvaging Allocator is ideal for use as a real-time core memory allocator, but because Binary Buddy allocation is widely used for managing disk storage, and because Salvaging Allocator is not significantly more complex or costly than the Binary Buddy allocator, it will be further appreciated that aspects of the subject technology can easily be adapted by one skilled in the art to the wide range of applications in which Binary Buddy allocation is currently employed, including the management of mass storage.

As used herein, the resource being allocated is referred to as a "unit". Units are numbered individually using nonnegative integers, and we refer to the nonnegative integer associated with a unit as its address. A contiguous address range is referred to as a block. A block is defined by an address and a length. The block address is the lowest-numbered address in the block and the block size is the length of the block. These will be referred to as the address and size of the block where there is no ambiguity. A request is expressed as a number of units called the request size. The request is assumed to be for a block whose length is the request size. The allocator responds to a request by returning a block of at least the request size that does not overlap any other live block. "Release" refers to the action of returning a previously allocated block to the allocator. This makes the units of that block once again available to the allocator for use in satisfying other requests. A "free block" refers to a block that is available for use by the allocator to satisfy a request. A "live block" refers to a block that has been allocated but that has not (yet) been released.

When it is the process of allocating or deallocating, the allocator handles blocks that may be neither free nor live. Free and live blocks are in general themselves sub-blocks of larger blocks. We call a block that is not a sub-block of a larger block an outermost block. In the Salvaging Allocator there may be multiple outermost blocks simultaneously under management by the allocator. The address ranges of two outermost blocks are generally disjoint. Beyond this, no assumptions are made about the distance between addresses that belong to different outermost blocks. This is true even when two outermost blocks happen to be adjacent. When reference to an address being aligned to an N-unit boundary is made, it refers to that address being an even multiple of N. The focus of the disclosure is with alignment to boundaries that are powers of two. Thus, reference to an address aligned to an N-unit boundary means that N is a power of 2 and that the low $\log_2 N$ bits of the address are zero. The offset of an address is the difference between the address and the address of the outermost block that contains it; that is, block-base where "block" is the block address and "base" is the address of the outermost block. Refence to an "offset is aligned to an N-unit boundary", means that the offset is an even multiple of N. As with address alignment, focus is generally on offset alignment to boundaries that are powers of two. Offsets have relative alignment, with respect to an outermost block, whereas addresses have absolute alignment.

A block whose size N is a power of two and whose offset is aligned to an N-unit boundary is referred to as a binary block. An outermost block is a binary block by definition, its offset is zero, and is therefore maximally aligned. Note that binary blocks are a (relatively small) subset of all the power-of-two-sized sub-blocks of an outermost block; they are constrained by offset alignment. In common terminology, one may say that binary blocks are naturally offset-aligned, meaning that they are offset-aligned to their size. Binary blocks of a particular size N are disjoint from one another. We refer to the two N-unit binary sub-blocks of a 2N-unit binary block as buddies. For purposes of illustration shown below, the N-unit binary sub-block at the lower address is referred to as the left buddy and the N-unit binary sub-block at that higher address is referred to as the right buddy. However, it will be understood that embodiments may switch reference to the significance of being "left" or "right" of a buddy block without departing from the scope of the invention. Thus, reference to direction as used herein is primarily for ease of the reader's understanding of tracking blocks and their relation to each other. In some embodiments, an outermost block has no buddy, but every other binary block has a unique buddy. The address of the buddy of a binary block is given by the formula:

buddy=base+((block−base)^size)

where block is the address of the binary block, base is the address of the outermost block that contains the block, size is the size of the block, and ^ is bitwise exclusive-or. The operation is undefined for a block that is outermost or not binary. The buddy's offset is the exclusive-or of the block's offset and its size; the buddy's address is the address of the outermost block plus the buddy's offset.

In the subject disclosure of the Salvaging Allocator embodiments, as in the Binary Buddy allocator, a free block is described with a size power of two. However, in the Salvaging Allocator, in contrast to the Binary Buddy allocator, a live block may have any non-zero size up to the size of the largest outermost block under management by the allocator. Outermost blocks first enter the purview of the allocator as free blocks, and so are likewise constrained to be binary blocks. There is an assumption that every request is for at least one unit. The Salvaging Allocator is undefined for a request of zero units. There are a number of simple workarounds for this situation if it arises in practice, such as signaling an error, or returning the zero address if it is otherwise unused. A common workaround is to round the zero request up to one, however for purposes of this disclosure this boundary condition will not be addressed any further.

In the illustrated scenarios that follow, blocks of memory of various sizes are shown adjacent to one another. It will be understood that a row of memory blocks depicted together represent addressable units in a memory storage embodiment. Generally, embodiments allocate, deallocate, salvage, and merge blocks of memory that are adjacent to each other. As will be appreciated, the prior art typically has problems with fragmentation because free blocks of memory are not adjacent to each other and are thus, difficult to process in response to a request for memory. Embodiments described below also overcome these aspects as well as the aforementioned problems in the art.

Exemplary Operations

Merge

Referring now to FIG. 1, an example of a "merge" operation is shown according to an exemplary embodiment. The merge operation takes a binary block that has been released and is to be merged with free blocks that are adjacent to it. It merges the block with its buddy if that buddy is free and has the same size as the block being released. If successful, it repeats the operation with the resulting, merged block. At each step of this process, a distinguished block is under consideration by "merge" for merging with its buddy.

In operation for example, block 50*a* is a binary block that has been released (a merge candidate removed from the group of free blocks). Block 50*a* is merged with binary buddy block 50*b*, the merged result of which is shown as block 50*c* (shown with a pattern fill) in the second row. Block 50*c* then merges with its adjacent binary buddy block of matching size, the result of which is block 50*d*, which in turn is merged with a free binary buddy block, the result of which is block 50*e*.

For sake of illustration, blocks with the heaviest fill pattern are live, white (no fill pattern) blocks are free, and "gray" blocks with an intermediate weight fill pattern (for example, blocks 50*c* and 50*d*) are neither free nor live. Since a released block is of course live at the point of release, one might expect block 50*a* to be black rather than white in the figure. We will explain, when we consider the operation Decompose below, why it is in fact free at the point that Merge operates on it in the Salvaging Allocator as formulated here. The merge stops when either the merge candidate's (block to be released) buddy is live or the size of the merge candidate and the size of the buddy differ. In the case depicted, the final merge candidate's (block 50*e*) buddy (block 50*f*) is live. When the buddy's size differs from the merge candidate's, it means that the buddy is currently divided into sub-blocks. It is impossible for the buddy to be larger than the merge candidate, as the latter is always as large as possible, short of being merged with its buddy, at the point where Merge treats it as the merge candidate. In all cases, Merge makes the final merge candidate free. By the final merge candidate, we mean the last merge candidate that Merge considers for merging with its buddy. Merge considers this block for merging but cannot proceed because, in this case, the block's buddy (50*f*) is live.

The effect of making the final merge candidate (block 50*e*) free is indicated in FIG. 1 by the white color of the final merge candidate. We will not bother to mention this final action of Merge (making the final merge candidate free) when we describe modifications to Merge below. Merge is, at this point, essentially the same as the corresponding operation in Binary Buddy allocation.

Salvage

Figure 2:
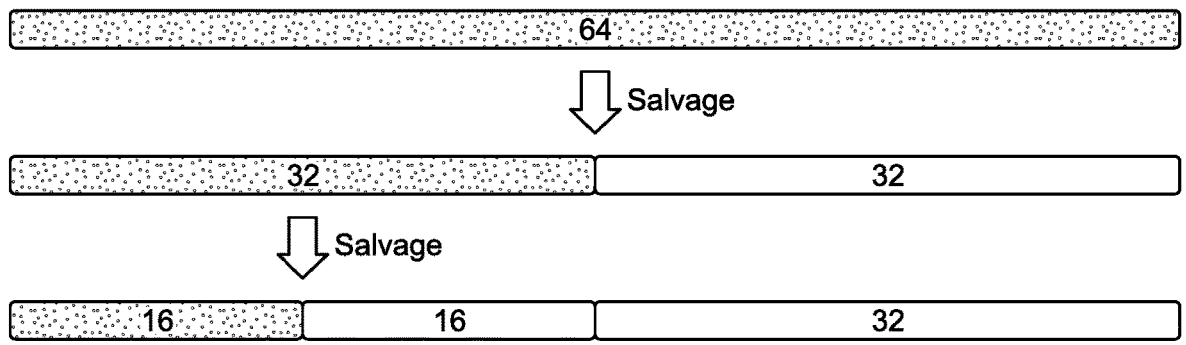
FIG. 2 is a diagrammatic view of a salvage allocation process for blocks of memory according to an embodiment of the subject disclosure.

Referring now to FIG. 2, a salvage operation process is shown according to exemplary embodiments. The Salvage operation takes a binary block that has been selected to satisfy a request, via the operation GetFree. GetFree returns a binary block whose size is greater than or equal to the request size. See FIG. 2. In this case, the request is for a 16-unit block. GetFree has returned a 64-unit free block.

The operation identifies the largest binary sub-block at the right end of the gray block that can be removed while leaving the gray block large enough to satisfy the request. The first such sub-block in this case (FIG. 2) has size 32. This sub-block is removed from the end of the gray block, the sub-block is made free, and the process repeats itself. Because the difference between the starting (binary) block size and the request size can be expressed as a binary number, that is, as a sum of powers of 2, this process must terminate leaving a block of exactly the request size. In this case the request is itself for a binary block. In such a case, the action of Salvage is the same as the corresponding operation in Binary Buddy allocation. The reader will notice that the starting block, returned by GetFree, is not free: it is gray in the figure. Neither is this block yet live, because "live" is the condition of a block that has been returned by the allocator in response to a request, whereas this block is still being processed by the allocator. GetFree has removed it from the "free" structures and it will ultimately be made live. We will give more precision to the notions of free and live and the requirements on GetFree when we discuss possible embodiments of the Salvaging Allocator in later sections.

Figure 3:
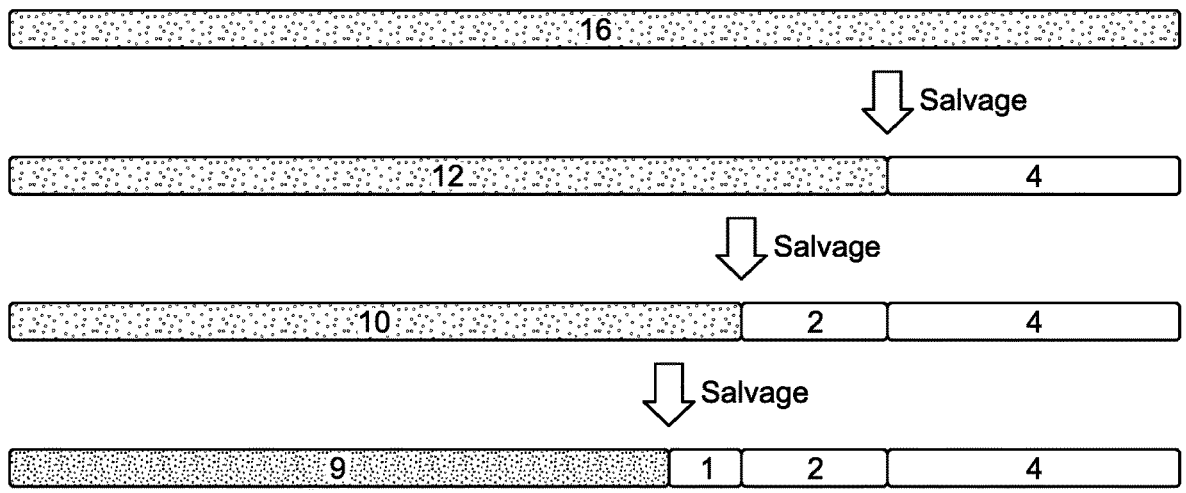
FIG. 3 is a diagrammatic view of another salvage allocation process for blocks of memory according to an embodiment of the subject disclosure.

Now referring to FIG. 3, another example of the Salvage process is shown with a different request size. Here the request is for 9 units. Let us assume that GetFree returned a 64-unit block as in FIG. 2. The first two steps of Salvage are therefore as depicted in FIG. 2 and are not shown again for sake of illustration. The operation continues as depicted in FIG. 3, with a 16-unit block as the first merge candidate, as in the last row of FIG. 2. Salvage continues removing binary sub-blocks until the request size, 9 in this case, is reached. It is Salvage that eliminates internal fragmentation from the Binary Buddy allocator, by making otherwise useless sub-blocks available as free blocks to the allocator. It is not by itself however a complete solution because it leaves us with odd-sized live blocks that we do not know as yet how to deallocate and merge into neighboring free blocks. Recall that Merge takes a binary block as the initial merge candidate.

Figure 4:
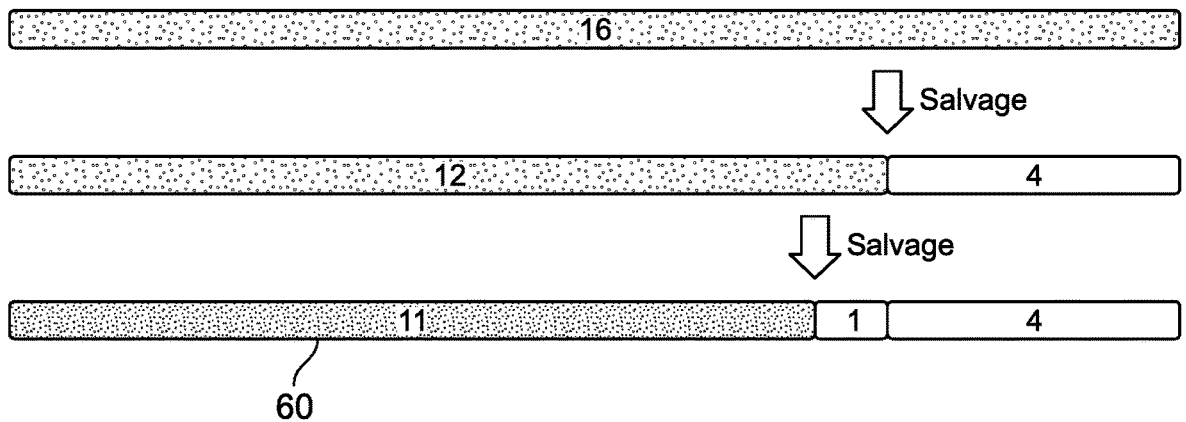
FIG. 4 is a diagrammatic view of another salvage allocation process for blocks of memory according to an embodiment of the subject disclosure.

FIG. 4 shows the effect of Salvage when a request of 11 units is satisfied by a free block of 16 units (or by a larger block which is first reduced to 16 units by Salvage as in FIG. 2). The final result of this process is released block 60.

Decompose

Figure 5:
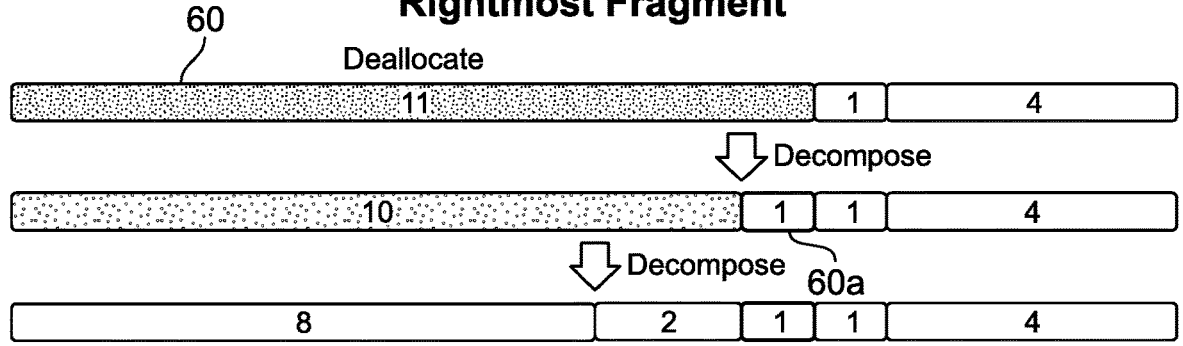
FIG. 5 is a diagrammatic view of a decompose process for blocks of memory according to an embodiment of the subject disclosure.

When we deallocate a non-binary block, we break it down into binary sub-blocks and make these sub-blocks free. This operation is called Decompose and is depicted in FIG. 5

The released block 60 is live and therefore shown in black. Note that the starting condition depicted is what resulted from FIG. 4. The operation removes the smallest binary sub-block from the right end of the released block and makes it free. This is shown as block 60*a* which is a 1-unit block released from the right end of block 60 (which was originally 11 units and has been modified into a gray block of 10 units) The process repeats with successively larger powers of 2 until the released block 60 in its entirety has been decomposed. Because every block size can be expressed as a sum of powers of 2, this process must terminate with no leftover units. Every block treated by Decompose is made free, even if the operation has otherwise no effect, i.e., even in the case where it is presented with a binary block. It is for this reason that the initial merge candidate in FIG. 2 is white (free). When the decomposition is complete, the deallocation process continues by invoking Merge on the rightmost sub-block that was created by Decompose. This is sub-block 60*a* in the case of FIG. 5. In accordance with the discussion above, the input to Merge, the initial merge candidate, is always a free binary block.

The Problem

Figure 6:
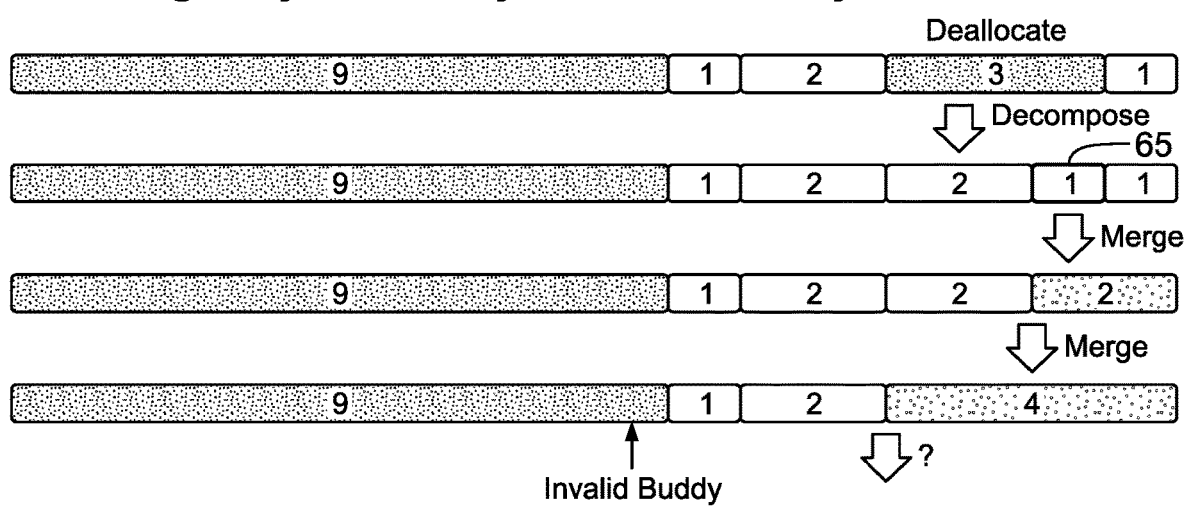
FIG. 6 is a diagrammatic view of salvage allocation and deallocation processes for blocks of memory according to an embodiment of the subject disclosure.

Referring now to FIG. 6, a scenario is shown where these operations are assembled into a complete scheme for allocation and deallocation.

In the starting condition there are two live blocks, one of 9 units and one of 3 units. The block of size 3 is released. The Decompose process breaks the size 3 block into binary components of size 1 and 2, and the Merge process commences from block 65 of size 1. We merge buddy blocks up to size 4, as shown in the last row. Now consider the predicament of the Merge operation: the "buddy" of the block of size 4 lies in the interior of the live block of size 9. This situation is problematic for a number of reasons. First, we don't associate (valid) free and size information with addresses that lie in the middle of a block. Second, some embodiments store free and size information in the blocks themselves, as opposed to holding them in other storage. Wherever the free and size information might be held, one cannot count on finding it associated with an arbitrary address in the middle of a live block. The upshot is that it is also unknown whether there is a free block at this address, nor can we know what it's "size" is, whatever that might mean in this situation. In this case, the merge candidate has an invalid buddy. The address of the buddy is well-defined, but the allocator does not in general associate free and size information with that address.

Max Size Constraints

As will be appreciated, in the salvaging allocator, this difficulty is solved by associating a maximum size constraint with every block. Reference to the maximum size constraint associated with a block is its "max size". Because the size of a block, as used here, never "changes", rather, a block at the same address but with a different size is spoken of here as a different block, there will be no ambiguity in the use of the term maximum size or max size: we always mean by this term the maximum size constraint associated with a block. As with size and free/live status, max size is associated with the first address in a block. Accordingly, the operations Salvage, Decompose and Merge are revisited to consider how they use and propagate the max size associated with each block according to embodiments of the disclosure.

Decompose Preserves Max Size Constraints

The handling of max size by the Decompose process associates the max size of the block being decomposed with each of the fragments that results. See FIG. 7.

The single number indicating the size of a block has been replaced by a pair of numbers, for example 11/64. Here, 11 is the size and 64 is the max size. Decompose results in three blocks, of size 1, 2, and 8, (from the original block of 11/64) and each of them has max size equal to that of the released block, 64 in this case. These two operations do not alter the max sizes of blocks outside their span of action. Decompose for example did not alter the max size of the 1/1 block to the right of the decomposed block. The blocks labeled 1/1 and 4/4 have somehow been assigned reduced max sizes. In the next sections we will see how this comes about.

Salvage Introduces New Max Size Constraints

Figure 8:
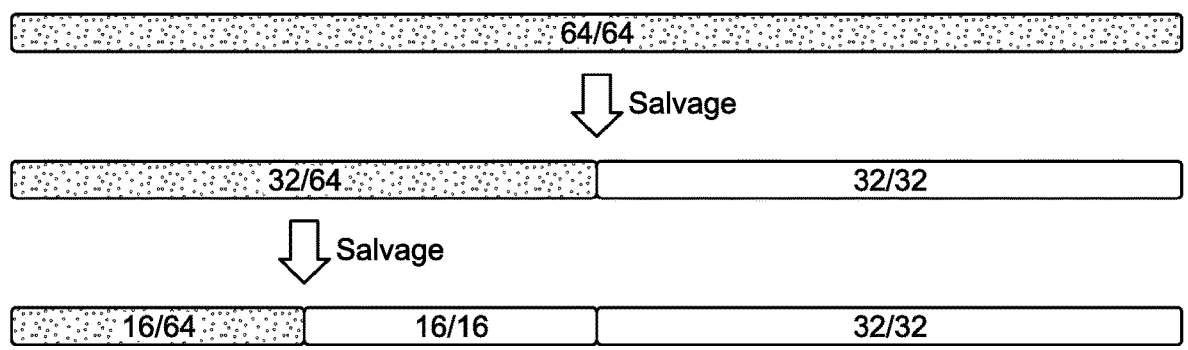
FIGS. 8 and 9 are diagrammatic views of the salvage allocation process for blocks of memory setting a new maximum size constraint as a result of the process of FIG. 7 according to an embodiment of the subject disclosure.
Figure 9:
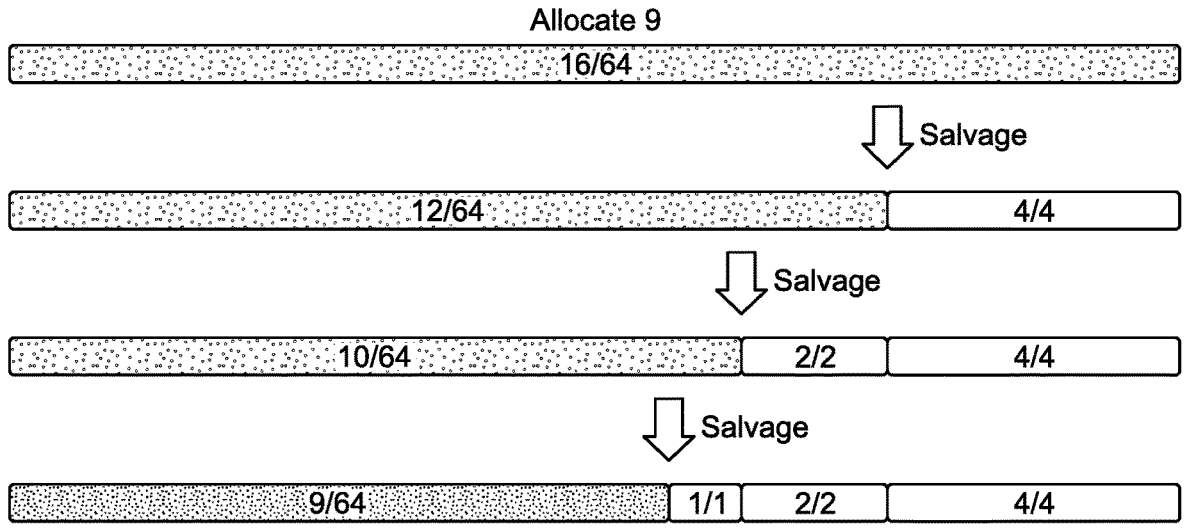

The Salvage process sets max size equal to size for each binary sub-block it removes from the starting block. It sets max size for the resulting (leftmost) block to the max size of the starting block. See FIG. 8 and FIG. 9. The three free blocks that result from the Salvage operation each have max size equal to size. The live (leftmost) block that results has max size equal to that of the original, 64 in this case.

Figure 10:
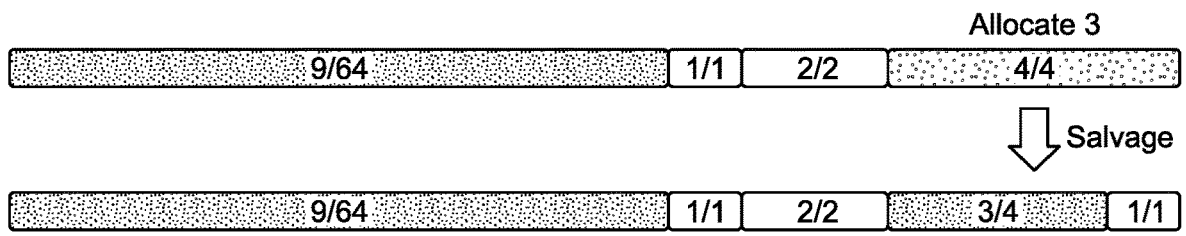
FIG. 10 is a diagrammatic view of the free blocks of memory that result from the salvage process of FIGS. 8 and 9 according to an embodiment of the subject disclosure.

Allocation/Salvage Within Former Internal Fragment: Before considering the treatment of max size by Merge, it is worth pointing out that allocation within a free binary block that has been created by Salvage or Decompose is ordinary allocation, and Salvage and Decompose act on such a block-within-a-block exactly as they do on an outermost block. See FIG. 10.

The gray block labeled 4/4 in the first row is selected for allocation of a request for 3 units. This block is broken into two. The resulting live block has size 3 and max size 4, the latter equal to the max size of the starting block; and the second block has max size equal to its size, 1 in this case. This treatment is no different than if the starting block were an outermost one.

Merge Propagates Max Size of Left Buddy

Figure 11:
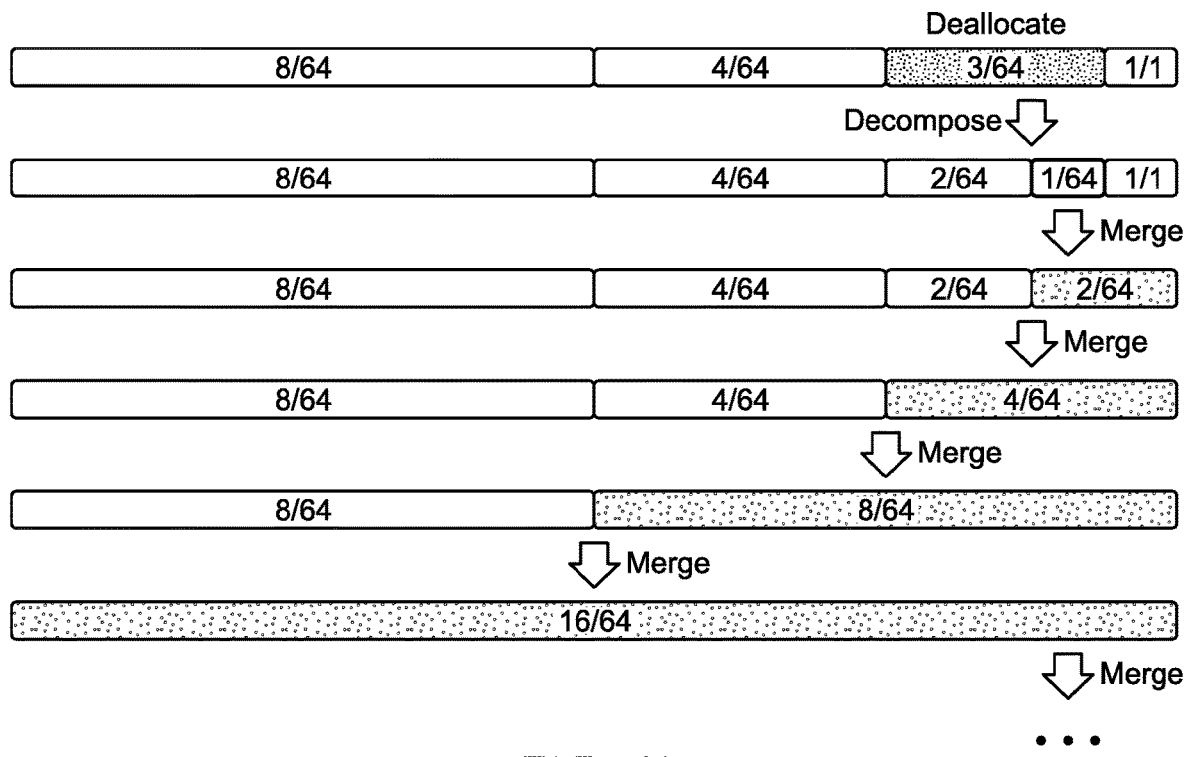
FIG. 11 is a diagrammatic view of the merge process propagating a new maximum size for blocks of memory according to an embodiment of the subject disclosure.

Referring now to FIG. 11, when Merge joins a block with its buddy, the resulting merged block takes its max size from the left most of the block and its buddy. By leftmost we mean the block or its buddy, whichever has the lower address.

Here the Merge begins at the second row, and the initial merge candidate is labeled 1/64. Its buddy has label 1/1. The max size of the result is 64 as 1/64 is the leftmost of the merge candidate and its buddy. Beyond the second row, all max sizes are equal between the merge candidate and its corresponding buddy, but in any event the leftmost of the two is used to obtain max size for the result.

Merge is Blocked by Max Size Constraint

Figure 12:
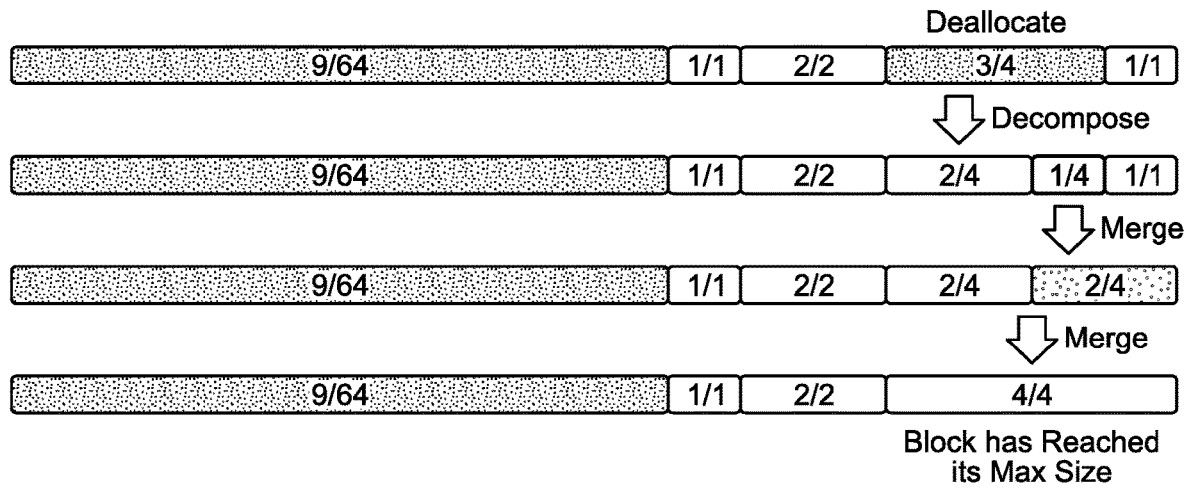
FIG. 12 is a diagrammatic view of the merge process terminating once a new maximum size for blocks of memory is reached according to an embodiment of the subject disclosure.

Referring now to FIG. 12, an embodiment shows how Merge stops when the merge candidate has reached its max size. Merging begins at the second row with the initial merge candidate labeled 1/4. By the fourth row the merge candidate has reached its max size, as indicated by the label 4/4, at which point no further joining of blocks occurs. This prevents Merge from querying the status of its possibly invalid buddy.

Merge is Blocked by Live Buddy

Figure 13:
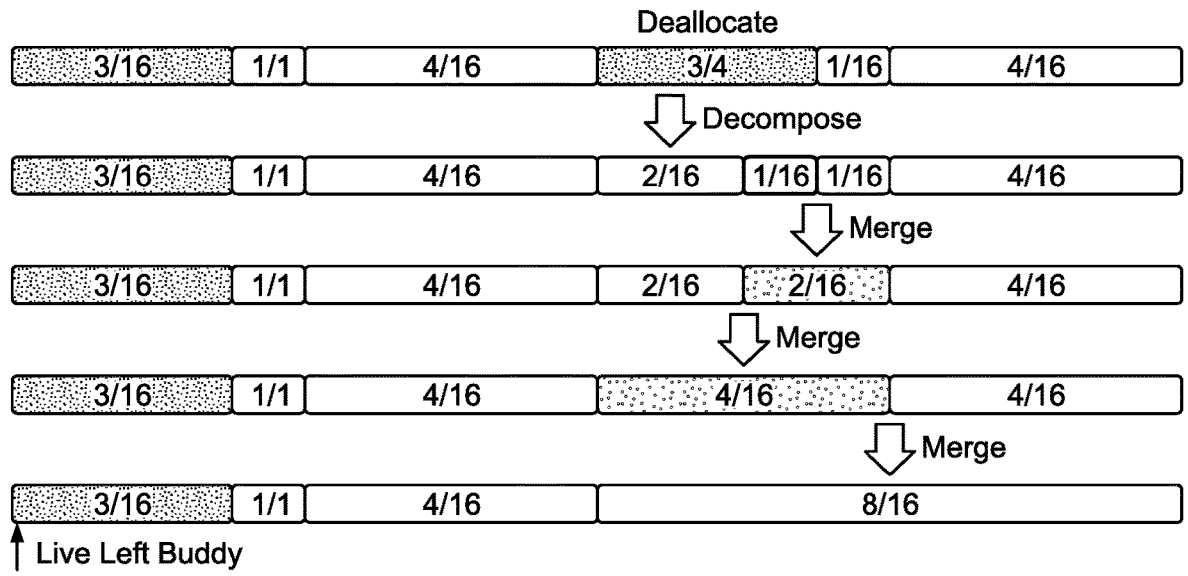
FIG. 13 is a diagrammatic view of the merge process terminating under the condition that a block of memory buddy is live according to an embodiment of the subject disclosure.

Referring now to FIG. 13, an embodiment illustrates the scenario where so long as a block has not reached its max size, Merge proceeds unless blocked. In this case it terminates when either the merge candidate's buddy is live, or the merge candidate's size is not equal to its own. In both cases, the buddy is live or its size disagrees with the merge candidate's. Merge acts differently depending on whether the buddy is the left or right buddy of the merge candidate. In the case of a live left buddy, Merge simply terminates as shown in FIG. 13.

The buddy of block 8/16 is the block 3/16, which is live, as indicated by its black color. Merge terminates at this point.

Figure 14:
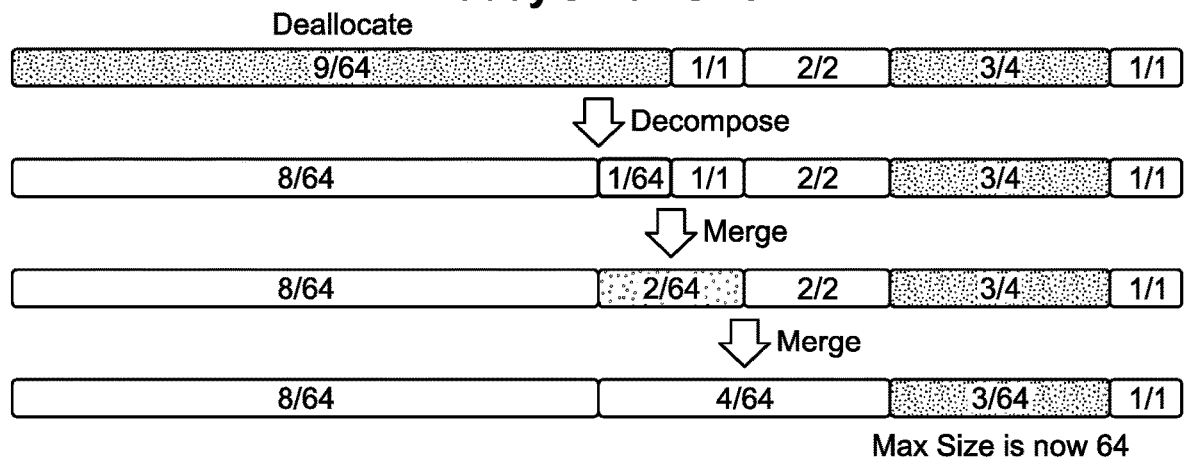
FIG. 14 is a diagrammatic view of the merge process adjusting a block of memory buddy according to an embodiment of the subject disclosure.

Referring to FIG. 14, in the case of a live right buddy, Merge sets the max size of the buddy to the max size of the merge candidate, and then terminates. This, along with the termination of Merge when a merge candidate reaches its max size, are the two key subtleties of the Salvaging Allocator. The latter blocks Merge when it is possible that a left buddy is invalid. The former undoes the effect of the latter, at the point where it is first known that it is safe to merge a max-size-restricted right buddy to a larger size, because the right buddy's left buddy (i.e., the current merge candidate) is now valid. In the first row of the figure, the buddy of the 3-unit live block 1 is invalid. By the time the fourth row of the figure is reached, the buddy of this block is valid. Merge adjusts the max size of the 3-unit live block to allow it to be merged with its buddy when it is eventually released and decomposed. The merge candidate's buddy is live in the case we are considering. We must also make this adjustment of the buddy's max size in the case in which it is not live but its size differs from the merge candidate's.

Note that in neither case of a live buddy that we have considered, live left buddy and live right buddy, is it asked what size the buddy has. The buddy's size is irrelevant to Merge if the buddy is live. The buddy will in general be a non-binary block at this point, and the Salvaging Allocator is not obligated to record the (arbitrary, non-power-of-two) sizes of live blocks. The Salvaging Allocator never requests the size of a live buddy.

Merge is Blocked by Buddy Size Disagreement

Figure 15:
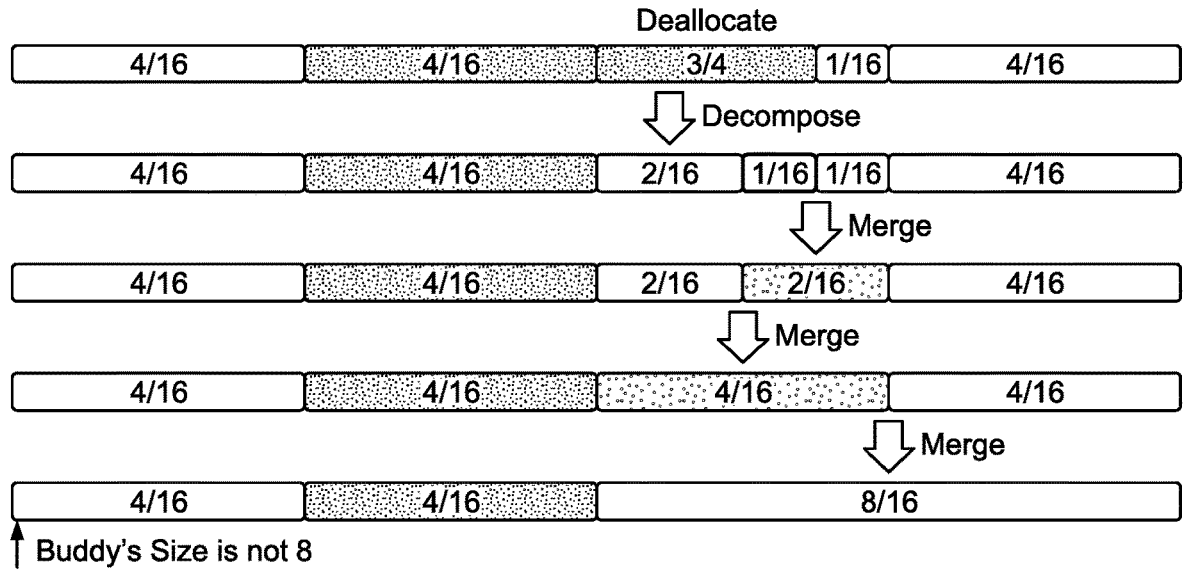
FIG. 15 is a diagrammatic view of the merge process terminating under the condition that a block of memory buddy is blocked by a divided buddy block of memory according to an embodiment of the subject disclosure.
Figure 16:
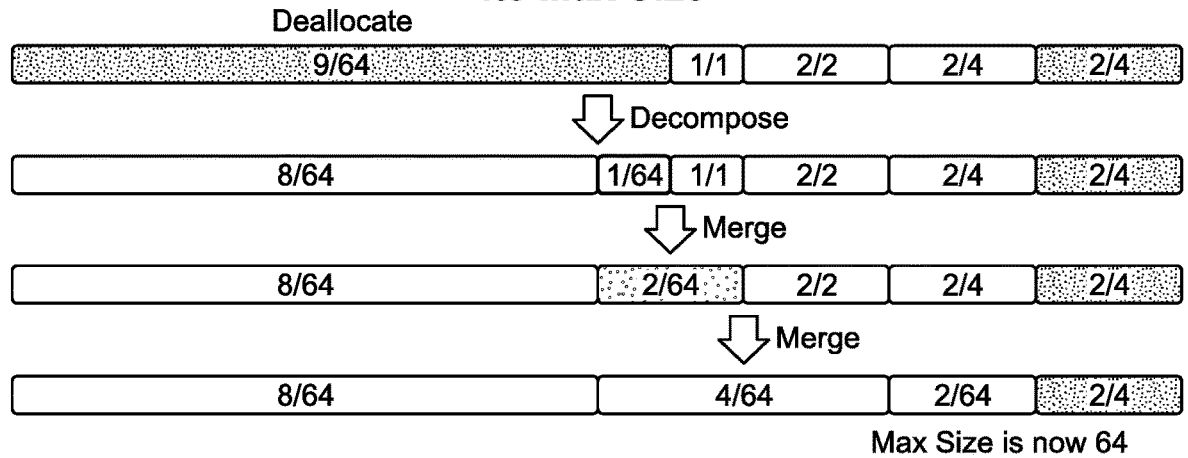
FIG. 16 is a diagrammatic view of the merge process with a block of memory buddy blocked by a divided buddy block of memory and the process adjusts for a new maximum size according to an embodiment of the subject disclosure.

Referring now to FIG. 15, when Merge is blocked by size disagreement with a free left buddy, Merge simply terminates, as in the case of a live left buddy. When Merge is blocked by size disagreement with a free right buddy, Merge sets the max size of the buddy to the max size of the merge candidate, as was done in the case of a live right buddy, for the same reasons and with the same effect. It is now safe for the buddy of the merge candidate to consult its own buddy (the current merge candidate) when it is eventually merged to the size that the current merge candidate has. See FIG. 16.

Properties of Max Size Constraints and Block Sizes

In order to understand why Merge as has been presented, is both correct and complete, note the following property of max size constraints as they are maintained by Decompose, Salvage and Merge processes. For any binary block, regardless of how its interior has been subdivided into free and live sub-blocks, the max size of its leftmost sub-block is greater than or equal to the max size of each of its sub-blocks; and the size of the binary block as a whole.

Consider a pair of binary blocks that are buddies. The max size of the left buddy must be at least the combined size of the buddies, which is to say, at least twice the size of each buddy. This is so by the second point above, because the left buddy is also the leftmost sub-block of the binary block that contains the two buddies. For example, see the last row in FIG. 8. The block labeled 8/64 is the leftmost sub-block of the binary block of size 16 that constitutes the whole row. Its max size is 64, which is as great as the largest max size among all sub-blocks of the row, and also as great as the size of the 16-unit block as a whole.

As a corollary to the above, we have this property: The leftmost sub-block of an outermost block always has max size equal to the size of the outermost block. For example, see the last row of FIG. 9. An outermost block of 64 units has been split by Salvage into numerous sub-blocks, but the leftmost among those sub-blocks still carries a max size of 64 which will ultimately permit all the sub-blocks to be merged so that the outermost block as a whole can be reconstituted.

Now consider a merge candidate whose buddy is to its right. As a special case of the foregoing properties, the max size of such a merge candidate is at least twice its size, for the reason that is the leftmost sub-block of the binary block containing both it and its buddy. This means that Merge has the following property: Merge never terminates due to a max size constraint in the case of a merge candidate with a right buddy.

If the right buddy is ready to merge (free and undivided), the merge candidate to its left will therefore always succeed in merging with it. If the right buddy is not ready to merge (live or divided), the merge candidate to its left removes the max size constraint on the buddy clearing the way for it to merge to at least the combined size of merge candidate and buddy if and when the buddy itself becomes a merge candidate.

If Merge terminates at a merge candidate whose buddy is valid and is to its left, the max size of the left buddy is always greater than or equal to the max size of the merge candidate. There is therefore no adjustment to make to the buddy's max size in this case. Moreover, it is easy to show this crucial property of Merge: If Merge terminates due to a max size constraint, then the merge candidate is an outermost block, or has a left buddy, and that buddy is either invalid, or live, or divided into sub-blocks.

If request sizes are restricted to powers of two, then it can never happen that the buddy of a block is invalid; invalid buddies arise only when a non-binary live block is created by Salvage. This means that when request sizes are binary, then when Merge terminates due to a max size constraint, it is terminating a merge at exactly the point that the Binary Buddy allocator would terminate the same merge, were it in the same situation. (The Binary Buddy allocator terminates a merge at an outermost block or when the block's buddy is live or divided into sub-blocks). These two properties of Merge taken together mean that in the case where all request sizes are powers of two, the Salvaging Allocator behaves identically to the Binary Buddy allocator in respect to the division and merging of blocks. Note that when the Binary Buddy allocator operates in a 64-bit address space, at most 64 block sizes can arise. In the Salvaging Allocator, up to $2^{64}$ block sizes can arise. Clearly therefore the foregoing property isn't the final word on the completeness and correctness of Merge. It is straightforward however to complete the proof given the above observations.

Deallocation Order and Merging

Figure 17:
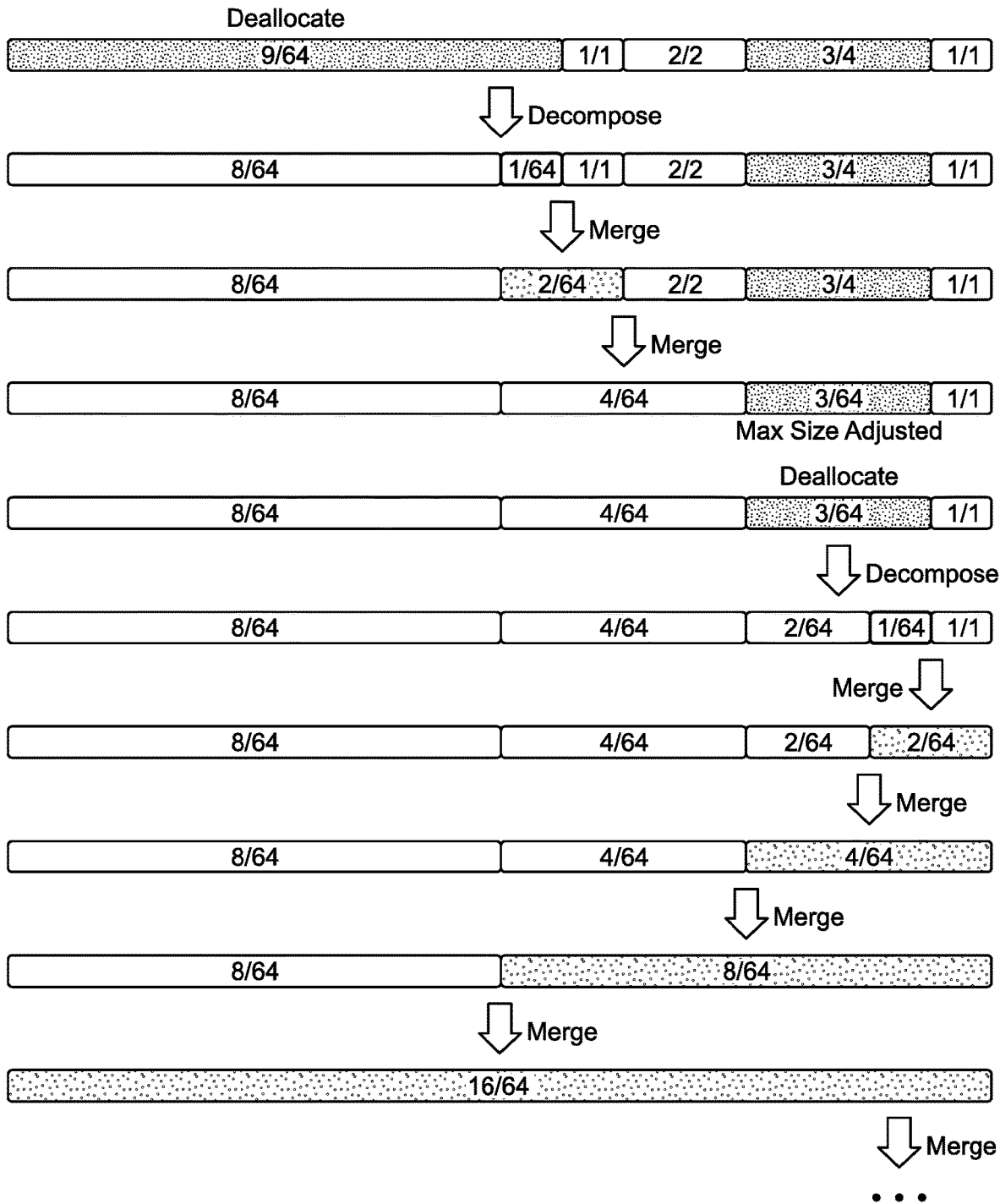
FIGS. 17 and 18 are diagrammatic views of a merge and deallocation process according to an embodiment of the subject disclosure.

Referring now to FIG. 17, an example of deallocation to see how Merge works in practice is shown according to an exemplary embodiment. The first row of this figure is the last row of FIG. 10, which is in turn the last row of FIG. 9. In other words, we begin from an allocation of 9 units followed by an allocation of 3 units, both of which are satisfied from the same 16-unit block. In FIG. 17 the 9-unit live block is deallocated first (row 1), followed by deallocation of the 3-unit block (row 5). The first Merge is initiated from block 1/64 in row 2, and terminates when it is found that block 3/64, the buddy of block 4/64 in row 4, is live. The max size of block 3/4 is adjusted upwards to 64, giving us block 3/64 in row 4. The second Merge is initiated from block 1/64 in row 6 and continues up to and beyond the final block of size 16 in the last row.

Figure 18:
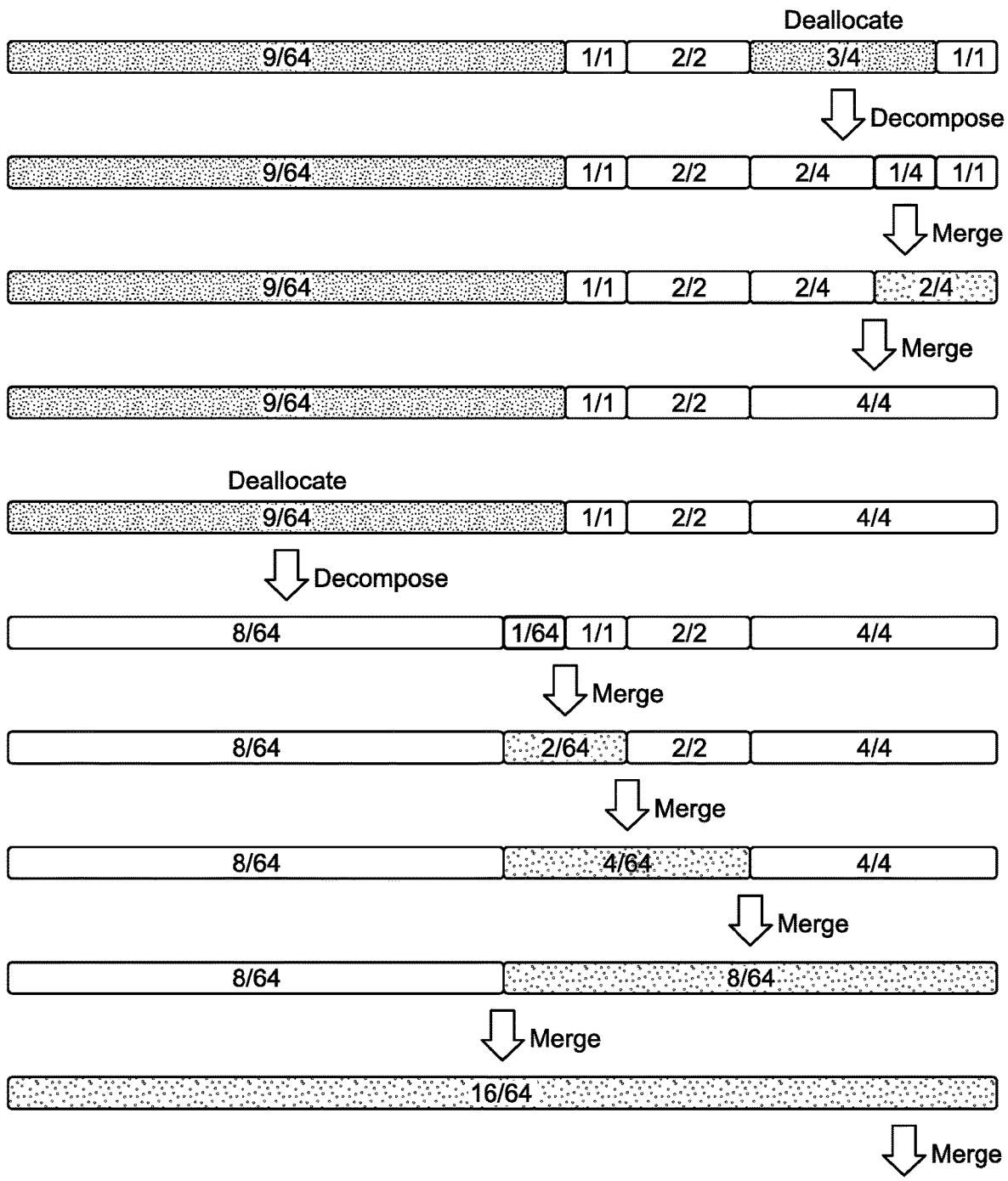

Referring now to FIG. 18, the first row represents the same starting condition as in FIG. 17, but in this case the 3-unit live block is deallocated first. The first Merge is initiated from block 1/4 in row 2 and terminates at row 4 when the merge candidate reaches its max size of 4. The second Merge is initiated from block 1/64 in row 6, and once again continues up to and beyond the final block of size 16 in the last row. The result of the two deallocation orders is identical, although the intermediate states they pass through differ.

Deallocation is not Allocation in Reverse

Figure 19:
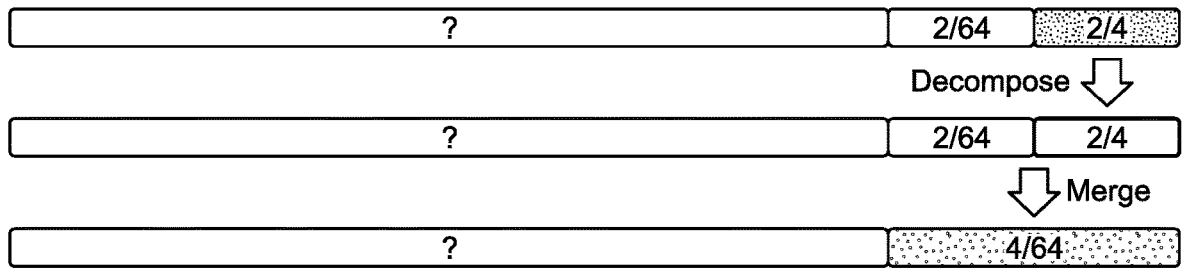
FIG. 19 is a diagrammatic view of a live block released from the process of FIG. 16 according to an embodiment of the subject disclosure.

The reader will bear with us while we return to the case of a merge candidate with a right buddy, in order to touch on another subtlety of the allocator. Consider FIG. 16 once more and in particular the last row. The block labeled 2/64 in this row had its max size constraint lifted by the merge candidate to its immediate left, labeled 4/64. Suppose that subsequently to this, following a sequence of further allocations and deallocations, the live block 2/4 in the last row of the figure is released and merged with block 2/64, which (let's say) is still free at that point. A block labeled 4/64 will result and will occupy the last 4 units of the row. The situation is shown in FIG. 19.

What is to guarantee that the max size constraint on this new block 4/64 is still valid at this point? A max size constraint of 64 means that as the block is merged, it is guaranteed that buddies exist all the way up to a merge candidate of 32 units. How can it be assumed that this condition still holds, given that the first two sub-blocks of row 4 of FIGS. 16—8/64 and 4/64—were free and available for allocation, and therefore for the action of Salvage, between the time that we arrived at the last row of FIG. 16 and the time that we arrived at the first row of FIG. 19?

Figure 20:
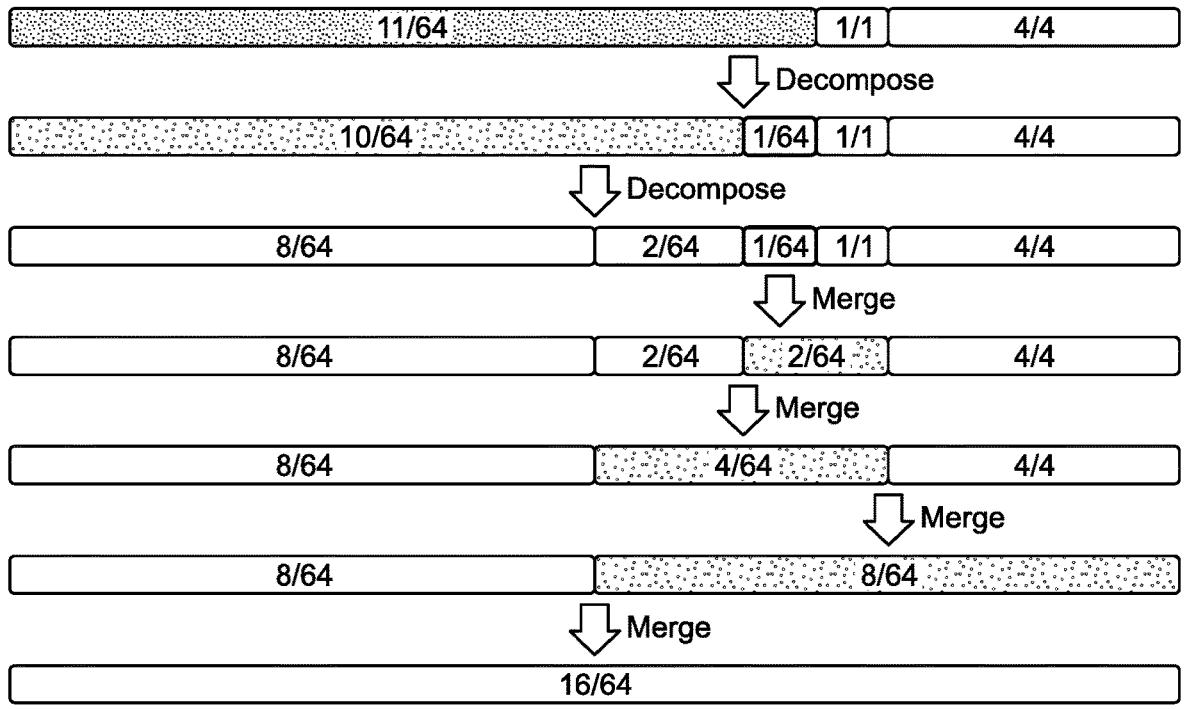
FIG. 20 is a diagrammatic view of an allocation process followed by a deallocation process according to an embodiment of the subject disclosure.

The answer is that while blocks 8/64 and 4/64 are available for subsequent allocation, they cannot be merged to a larger size until live block 2/4 is released. Barring such a merge to a larger size, any Salvage operations that are applied to blocks 8/64 and 4/64 can operate only within the boundaries of those blocks, as they are restricted to operating on binary blocks. We are guaranteed that the "buddy boundaries" of blocks 8/64 and 4/64 will remain intact until those blocks are merged away, which can only happen if they are merged with blocks to their right including and namely the newly formed block 4/64 at the right end of row 3 of FIG. 19. In other words, whatever the condition of the 12 "?" units in FIG. 19, we know that the boundaries of the original blocks 8/64 and 4/64 within it are intact at this point. The 12 units might be further subdivided into free and live sub-blocks, but the buddy of the rightmost 4/64 block exists. If it was not already clear, this discussion should make it clear that there is an asymmetry between allocation and deallocation in the Salvaging Allocator. See FIG. 20. In this figure, an 11-unit live block is created by Salvage from a 16-unit block. In row 4 this same 11-unit block is released, decomposed, and merged. It is easy to see from the figure that the path taken by deallocation is not the reverse of the path that allocation takes to arrive at the 11-unit live block. This asymmetry arises because free blocks are restricted to binary blocks, whereas live blocks have arbitrary size. We can summarize the net effect of this asymmetry thusly: if a free binary block of size 2K is used to satisfy a request for more than K units, then it cannot be used to satisfy another request for more than K units until it is reconstituted by Merge into (at least) a 2K free block. Looked at differently, this is a simple consequence of the fact that a request for N units is always satisfied by applying Salvage to a block returned by GetFree: the latter returns a binary block of at least $2^{\lceil \log_2 2N \rceil}$ units in response to a request for N units. The following points are important to keep in mind when considering the workings and storage requirements of the Salvaging Allocator:

free blocks are binary blocks in the Salvaging Allocator
    the Salvaging Allocator never requests the size of a live buddy The second point was discussed above.

The Salvaging Allocator in Flowcharts

Blocks and their Addresses

Up to this point in the document, blocks have been considered in the abstract, where there is no problem to speak of sub-blocks of a blocks. Two buddies are sub-blocks of a larger binary block for example. Conceptually, in other words, blocks can overlap or even have the same first address and differ only in size. When representing the notion of a block physically however we rule these possibilities out: Every address under management belongs to exactly one block in the Salvaging Allocator after each Salvage, Decompose, and Merge operation.

This condition also holds, of course, for the addresses in an outermost block before it is first divided into sub-blocks by Salvage. It may happen while in the midst of a Decompose operation that an address appears momentarily to belong to no block or more than one block, but this is temporary and happens simply because the allocator's structures are being updated to reflect a new configuration of blocks.

The address of a block is used to represent the block in the flowcharts and code that follow. By block address it is meant the first address in the block, although variations on this are possible; an address at a constant offset into the block, or a shifted address might be preferable in some embodiments for example. The requirements on a block address include being able to:

associate size, max size, and free status with a block address
    compute the buddy of a block from its address (that is, obtain the address of its buddy)
    compare the relative positions of two blocks using operators < and > on their addresses.

Notation in the Flow Charts

In the flowcharts described below, p, p0, b, u, B, and B1 hold block addresses. All other variables (N, S, etc.) in the flowcharts are nonnegative integers. Addresses are nonnegative integers, so in reality there is only a single variable type here. A left-arrow is used to mean assignment. The operator "=" is used to mean integer equality, "<" and ">" are unsigned magnitude comparisons. A conditional branch is shown as a diamond-shaped box that contains a conditional test. Control flows into the top of the diamond. If the test is true, the path labeled yes is followed, and if it is false the path labeled no is followed. Where multiple paths overlap, they share a common outgoing arrowhead to indicate their collective direction. In other words, to know which direction control is flowing along any connection in the flowchart, follow that connection to both of its ends; exactly one end has an arrowhead and that arrowhead determines the direction of control flow for all the paths that converge to that point.

Each flowchart represents a single procedure with a single entrance and single exit shown as ovals. The parameters to the procedure are shown in the entrance: Salvage (p, N) for example. As it turns out, Salvage, Decompose and Merge are each invoked from exactly one spot within the allocator as a whole, so their flowcharts can be incorporated into the contexts where they are used without any difficulty. Operations in the flowcharts are referred to by numerals enclosed in parenthesis.

On the Association of Size, Max Size, and Free/Live Status with Blocks

In the figures up to this point, we have shown size and max size for every block in a figure, regardless of its free/live status. Every block does of course have a size, conceptually. But the Salvaging Allocator does not maintain a size association for live blocks. The practical significance of this is that only $\log_2 \log_2 N$ bits are needed to encode a size N that is a power of two. The value $\log_2 N$ is sufficient to represent its size exactly, and $\log_2 \log_2 N$ bits are sufficient to represent this value. Since max size is always a power of two, that means that size and max size each require only $\log_2 \log_2 N$ bits per block, where N is the size of the largest outermost block under management by the allocator.

The following properties of size and max size associations can be deduced from the flowcharts we present below, but it's easier to understand the flowcharts if one keeps them in mind from the outset:

The Salvaging Allocator only associates sizes with binary blocks.
    The Salvaging Allocator therefore does not associate sizes with live blocks.
    The Salvaging Allocator associates max size and free/live status with all blocks.

Salvage

Figure 21:
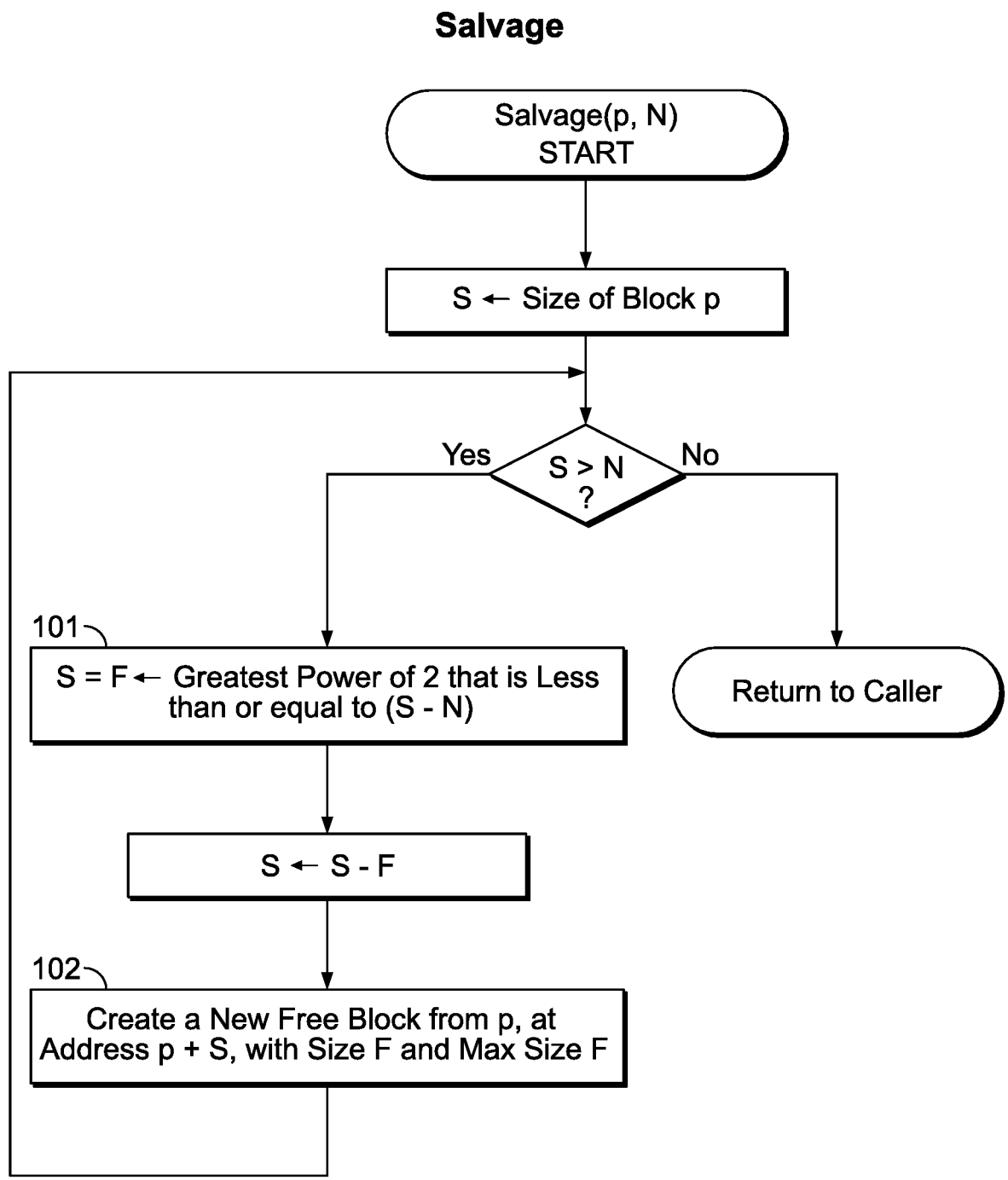
FIG. 21 is a flowchart of a process for salvaging a block of memory according to an embodiment of the subject disclosure.

Referring now to FIG. 21, p is a binary block whose size is to be reduced to N. The procedure strips successively smaller powers of two from the right-hand end of p, creating free blocks from them, until p has reached the desired size.

The creation of a new free block (101) sets its size, max size, and free status, and any other information that is associated with a block. The additional information may include, for example, an indicator of which outermost block the free block belongs to, when multiple outermost blocks are under management by the allocator. It is because of this nameless additional information associated with a free block that the qualification from p appears in the operation that creates a free block in the flowchart. The additional information, whatever it might be, is copied from or derived from p, which is known to belong the same outermost block as the new free block.

Note that Salvage does not associate a size with the final block of size N. At the exit from Salvage, p does not have size of a power of two in general and will shortly be made live. A max size and free/live status is however associated with p, and these are not changed by Salvage: on exit from Salvage they may have whatever values they had at entrance. This is not problematic since these quantities are associated with the address p and are not affected as we strip binary sub-blocks from the end of the block. Because N is non-zero (it is a request size), the new free blocks we create (101) need not include one at the address p itself.

It may be necessary to inform a Decompose process (described below) that p has N units when it comes time to release it. We will return to the question of how this may be done shortly.

It is possible to run Salvage forward instead of backward, creating free blocks from left-to-right rather than right-to-left. This requires changing the computation of F (102) to use "the greatest power of 2 that divides (S−N) evenly" in place of "the greatest power of 2 that is less than or equal to (S−N)", along with other minor amendments. See FIG. 23 below for an analogous reversal of Decompose. The net effect of the operation is the same either way.

Decompose

Figure 7:
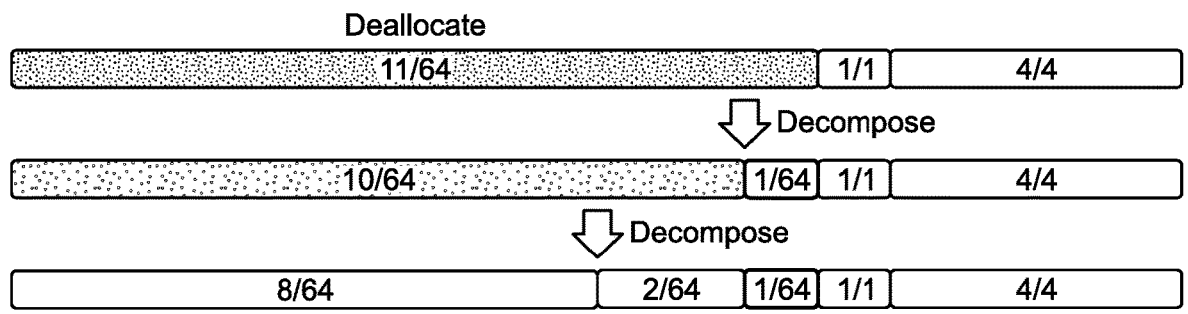
FIG. 7 is a diagrammatic view of the decompose process for blocks of memory under a maximum size constraint according to an embodiment of the subject disclosure.
Figure 22:
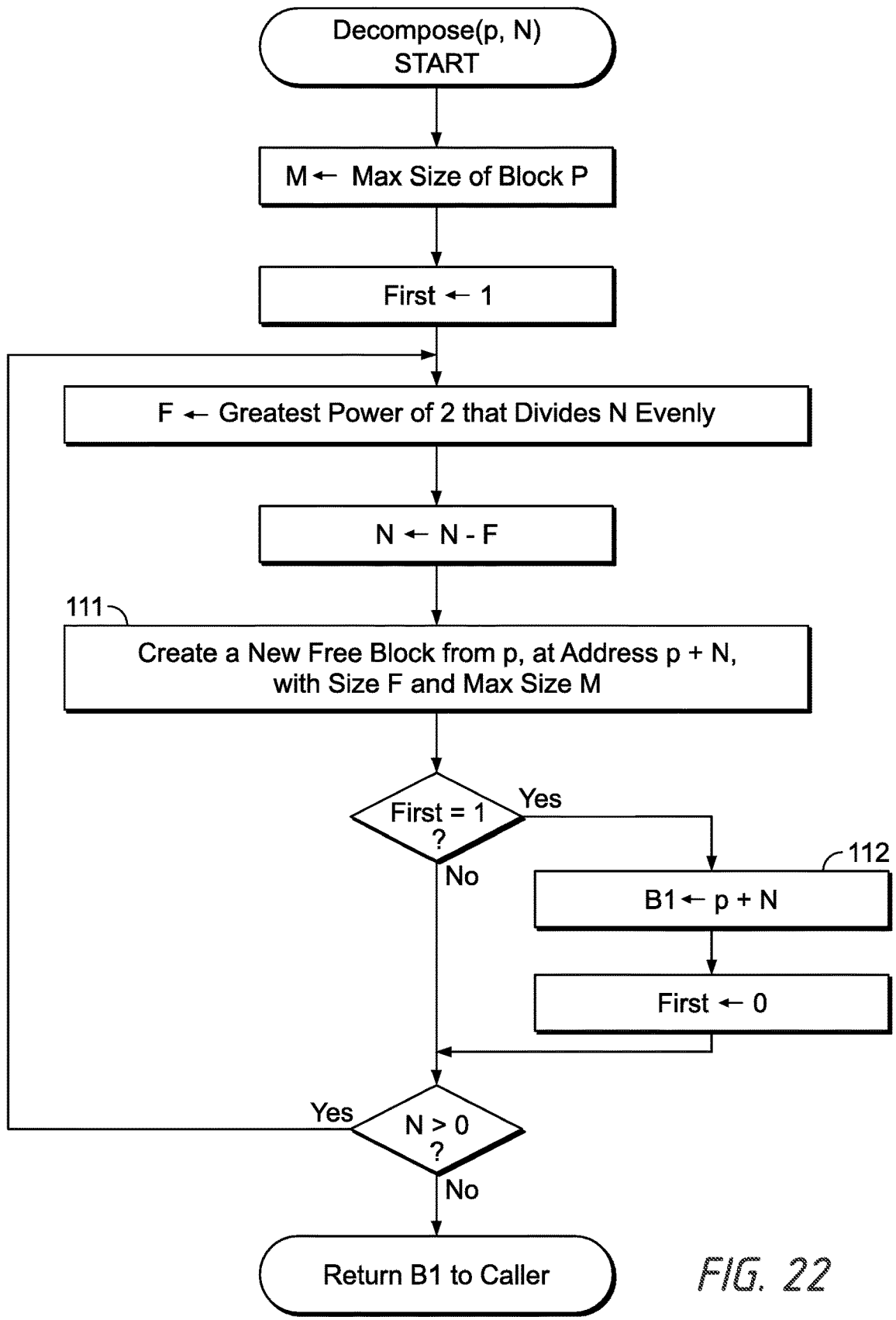
FIG. 22 is a flowchart for decomposing a block of memory according to an embodiment of the subject disclosure.

Referring to FIG. 22, a process for Decompose is shown according to an exemplary embodiment in which the operation is performed right-to-left, as per FIG. 5 and FIG. 7. Blocks of successively larger powers of two are stripped from the right-hand end of p and are made free. Their max size is that of p, which does not change. In the last iteration of the loop, N is zero, and therefore a new free block is created at address p itself (111). This free block represents the largest power of two that is no greater than the initial value of N. Because the Merge subsequent to Decompose begins at the rightmost free block created by Decompose, the right-to-left version of Decompose keeps track of this block (112), for which purpose it uses the variable first to determine whether the iteration being performed is the first one.

Figure 23:
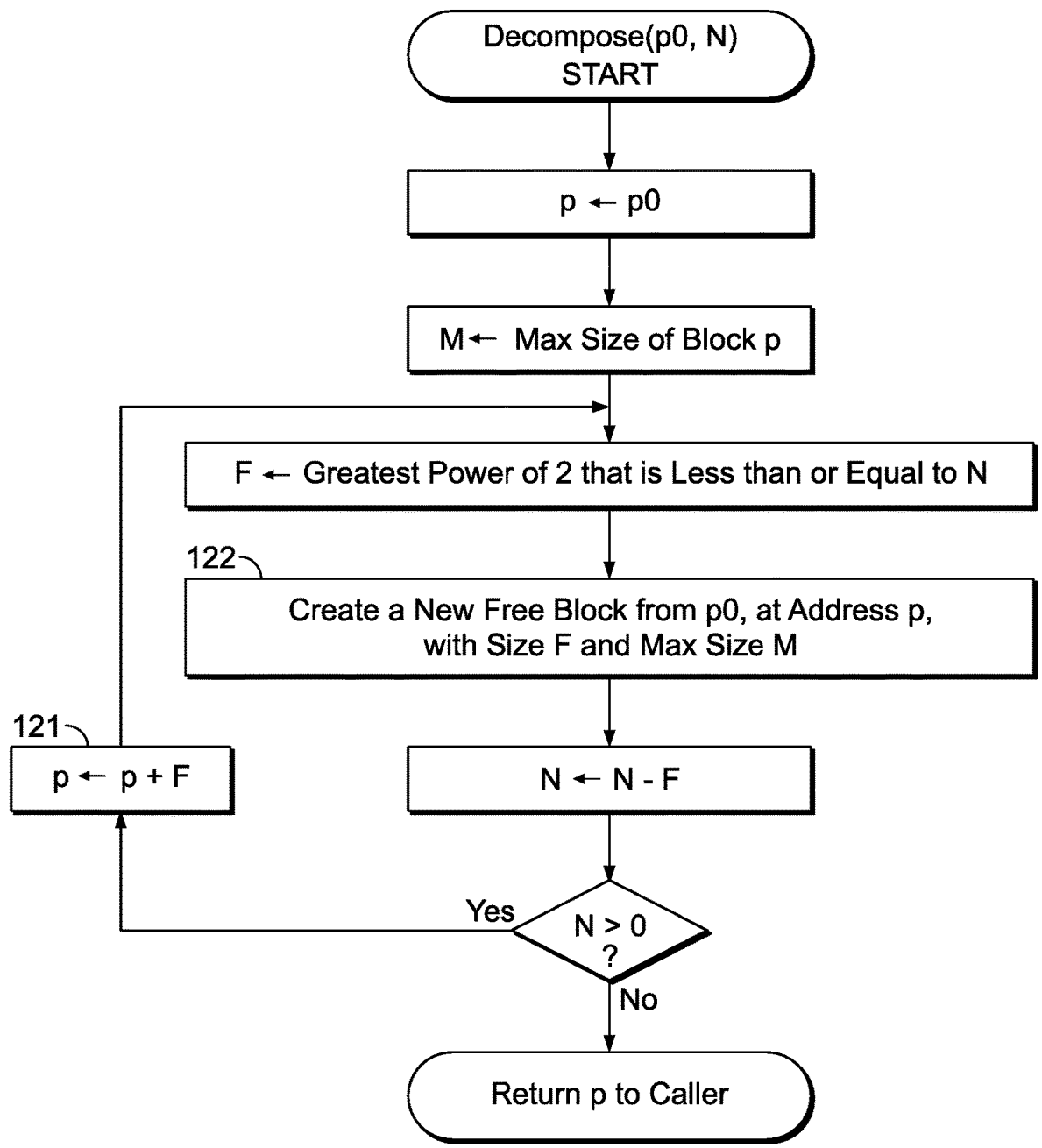
FIG. 23 is a flowchart for decomposing a block of memory according to another embodiment of the subject disclosure.

It is however possible to perform Decompose left-to-right, as shown in FIG. 23. In this version, successively smaller powers of two are cut from p and made free. In the case of left-to-right operation, the last block cut from p is the rightmost one, so no additional effort is needed to keep track of it, provided that the advance of p (121) is placed on the back-edge of the loop as we have done here.

We use p0, the block address that Decompose begins with, as the from address in the operation that creates a new free block (122). See the discussion above concerning the association of information beyond size, max size and free status with blocks. We cannot use p because on the second and greater iterations of the loop, p is an address that was previously in the middle of the original block p0; there is no (valid) size, max size, or free information associated with such an address. Note that in the first iteration of the loop, p0 is both the address of the new block and the address from which we copy any additional information that is to be associated with the new free block. An embodiment must therefore be prepared for the possibility that the destination and source are the same address in "new free block" operations. (The same is true of the last iteration of the loop in FIG. 22.)

Merge

Figure 24:
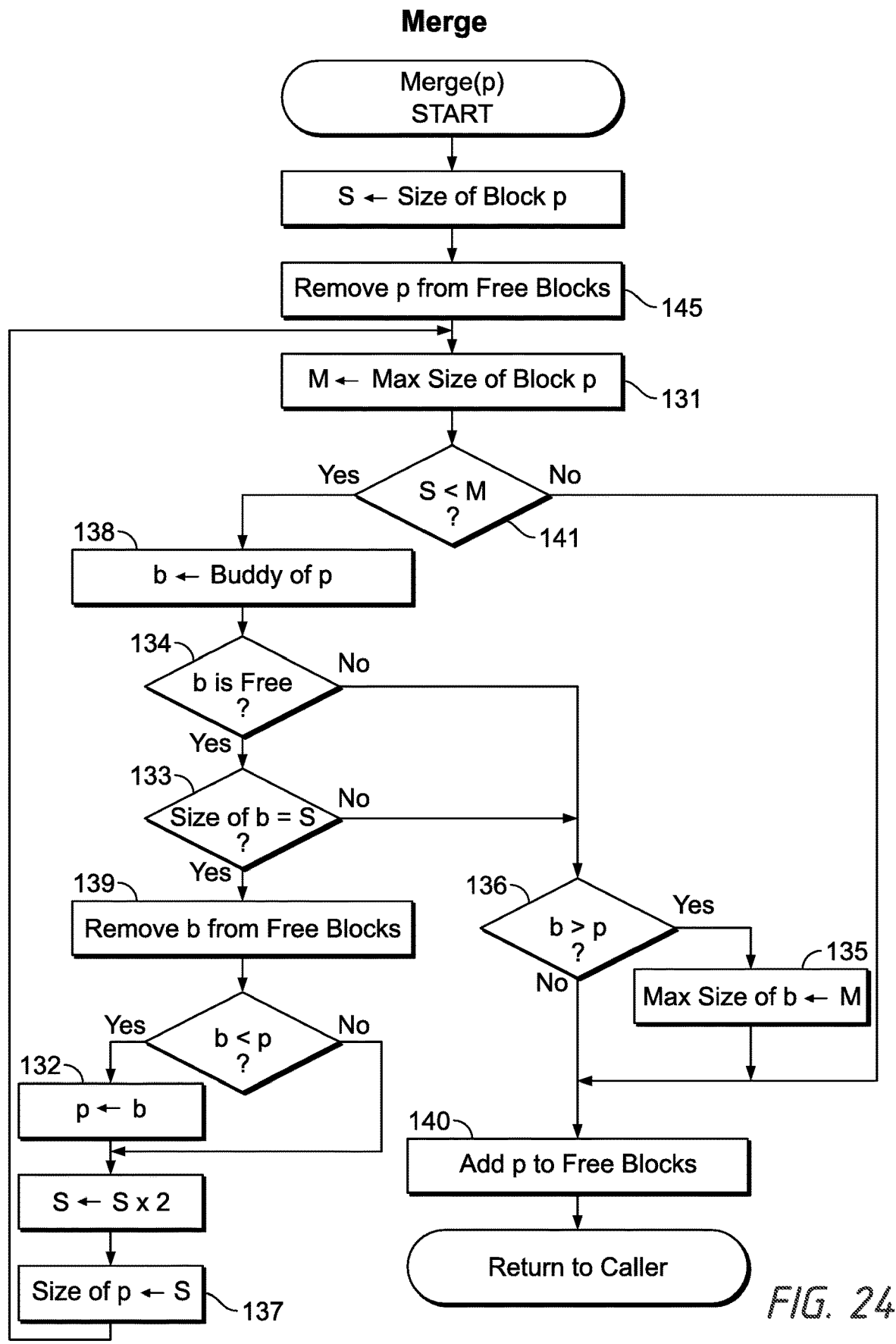
FIG. 24 is a flowchart for merging blocks of memory according to an embodiment of the subject disclosure.

Referring now to FIG. 24, a merge process is shown according to an exemplary embodiment. As an initial step, the size S of a merge candidate block is determined. The candidate block may be removed (145) from the free blocks. The variable M that is assigned max size for the current value of p (131) is not loop-invariant. This is because Merge implicitly picks up the leftmost max size value at the assignment p←b (132) as a side-effect of setting p to the address of the leftmost of p and its buddy b. See also FIG. 19, rows 2 and 3 for an example. The merge candidate in row 2 has max size 4 but the resulting merged block in row 3 has max size 64, which it inherits from the buddy of the merge candidate in row 2 via the assignment p←b.

Generally, the size of a live block is not queried. The test size of b=S (133) is guarded from above by the test b is free (134). The max size of a right buddy is adjusted (135) whenever Merge terminates with a buddy to the right of the Merge candidate. The condition "right buddy" is determined by the test b>p (136) on the addresses of b and p.

It is necessary to set the size of p on every iteration through the loop with the assignment size of p←S (137), because the computation of a buddy (138) implicitly queries the size of p.

The operations remove b from free blocks (139) and add p to free blocks (140) have the effect of setting the free/live status of block b to not free and that of block p to free; but beyond this they make these blocks unavailable and available, respectively, for use by the allocator in satisfying new requests (see operations (162) and (153) in Allocate below). Note that the merge candidate p is not a free block; it is removed from the set of free blocks (145), and the loop maintains this property by removing each buddy it merges with from the set of free blocks; but neither is it a live block. The merge candidate has the non-free/non-live status that is indicated by intermediate fill pattern weight in FIG. 1.

Allocate

Figure 25:
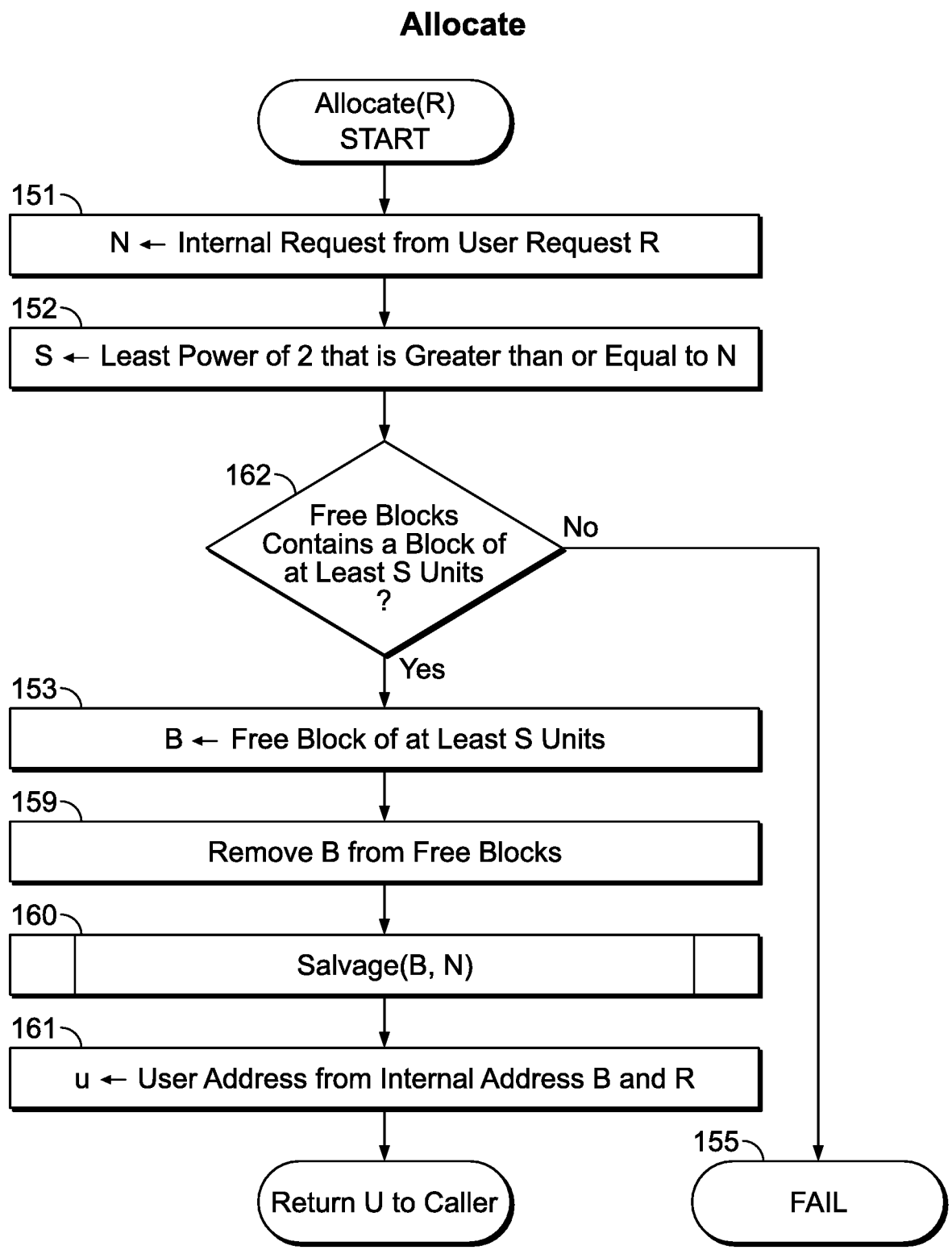
FIG. 25 is a flowchart for allocation of blocks of memory according to an embodiment of the subject disclosure.

Referring now FIG. 25, an exemplary process of the Allocate function, which is the entry point for allocation in the Salvaging Allocator, is shown according to an exemplary embodiment.

The user request is for R units. In some embodiments, size, max size, and free information may be stored within the units of a block as the means of associating that information with the block's address. In other embodiments, a minimum alignment may be imposed on all live blocks. To accommodate these possibilities, the user request R is converted to an internal request N in an embodiment-specific way (151). In the simplest case, this operation is simply N←R.

The (internal) request size N is not a power of two in general. S is set to the least power of two that is greater than or equal to N (152). Obtain a free block of at least S units (153), if such a free block is available (162). If a suitable free block is unavailable, the allocator fails (155); it is unable to satisfy the request.

Salvage expects a block that is not free. To accomplish this, B is removed from the set of free blocks in the case that B is a free block (159). This operation has the side-effect of setting the free/live status of B to not free. The invocation of Salvage (160) can be understood as a shorthand for the flowchart of Savage itself, with appropriate initialization and isolation of the variables that are local to that flowchart. Alternatively, it can be understood as a "call" to that flowchart with the initial value of Salvage's parameters taken from the corresponding arguments in the invocation. There is no difference between these interpretations.

The address that the client of the allocator (the "user" if you will) receives need not be the same as the block address manipulated by the allocator internally. If for example size, max size, free/live status, or other information is stored in the units themselves, then it might be desirable to present to the user an address that is just past the units that hold this header information. The conversion from internal address to user address (161) takes both B and R as inputs, as some embodiments associate the user request R with the address u. In the simplest case the operation (161) will simply be u←B.

Flowchart for DeallocateRequest

Figure 26:
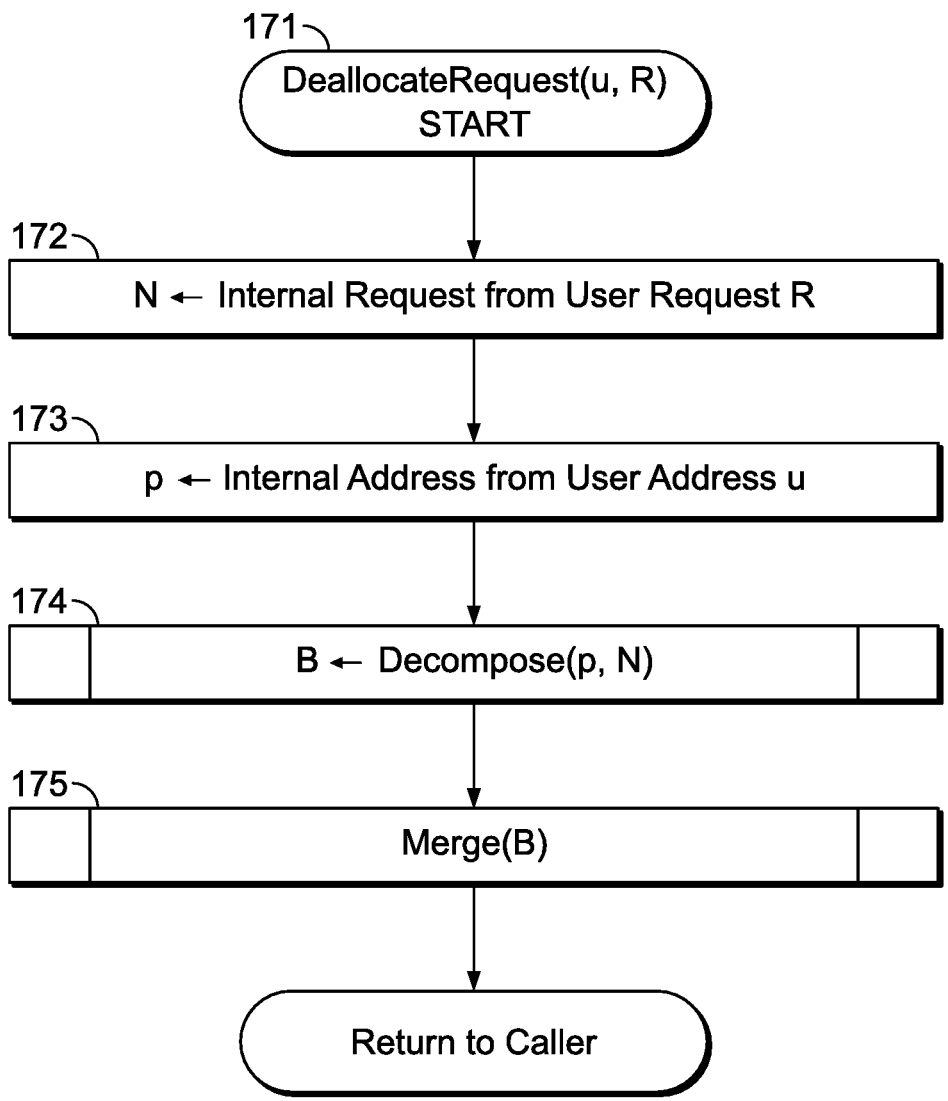
FIG. 26 is a flowchart for deallocation of blocks of memory according to an embodiment of the subject disclosure.

Referring now to FIG. 26, a process for DeallocateRequest is shown according to an exemplary embodiment. An embodiment of the Salvaging Allocator is not obligated to associate a size with a live block. For this reason, it is not necessarily the case that on deallocation, the size of the live block being released is known to the allocator. Such an embodiment therefore imposes upon the client of the allocator the responsibility for supplying the original request size R to DeallocateRequest. It is for this reason that R appears in the parameter list for DeallocateRequest (171). On the other hand, an embodiment may choose to associate sizes with live blocks. Such an embodiment can provide a Deallocate that takes only the address of the block to release (u). Operation (172) is the inverse of operation (151) in FIG. 25, and operation (173) is the inverse of operation (161) of FIG. 25, except that the latter does not produce the original user request R from u, as explained above. Essentially, DeallocateRequest is Decompose (174) followed by Merge (175), with the rightmost free block that Decompose creates as the first merge candidate. As with Salvage in Allocate, the invocations of Decompose (174) and Merge (175) may be understood as shorthand for the flowcharts of those functions with appropriate isolation and initialization of their respective local variables, or else as "calls" to those flowcharts. The effect is equivalent.

Dynamic Management of Outermost Blocks

In some embodiments, outermost blocks come to be available for use by the allocator. For example, in one embodiment, the outermost blocks are put into the set of free blocks before Allocate is first called. If an embodiment wishes to somehow dispose of outermost blocks, in the simplest case it might wait until the allocator is no longer in use and disposes of them as it sees fit at that time.

There is another possibility however. The Salvaging Allocator can easily be amended to permit outermost blocks to be managed dynamically. In such a scheme, Allocate calls for a new outermost block when it finds that no suitable free block is available at (162) in FIG. 25, and passes that block to Salvage at (160) in the flowchart.

In a similar way, Merge can be amended to detect an idle outermost block: an outermost block that has been merged to its full size, and that therefore contains no live data. An opportune moment to do this is at operation (141) in FIG. 24, and in particular along the no path that leaves that operation. At that moment in the flowchart, it is known that block p has been merged to its max size. While it doesn't follow that p is necessarily an outermost block, so long as the condition S<M is true (yes), it is impossible that p idle: if p is divided into sub-blocks then at least one of those sub-blocks must be live. So, roughly speaking, this is the earliest moment when it is possible that an outermost block has become idle.

Figure 27:
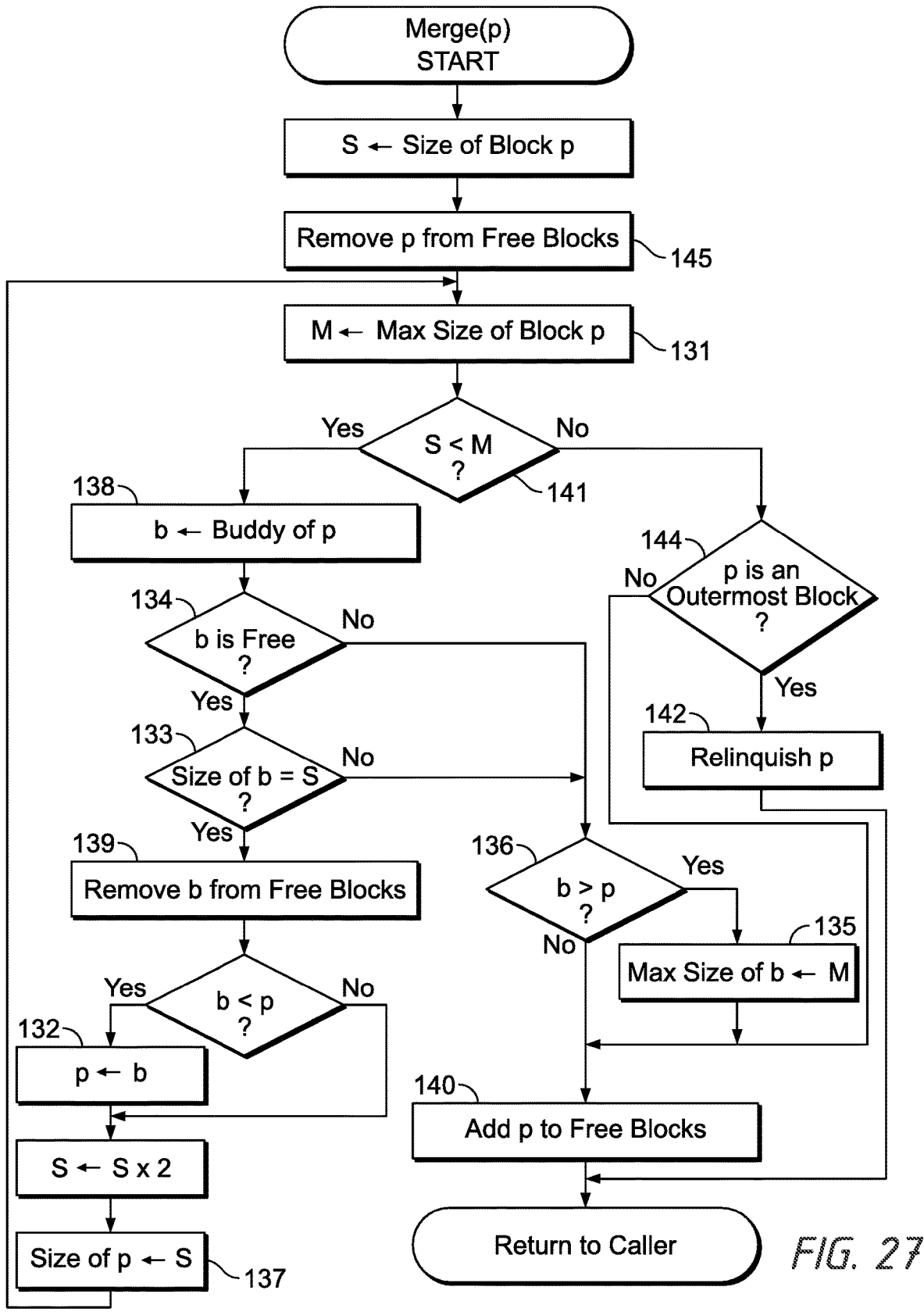
FIG. 27 is a flowchart for a merge process of blocks of memory according to another embodiment of the subject disclosure.
Figure 28:
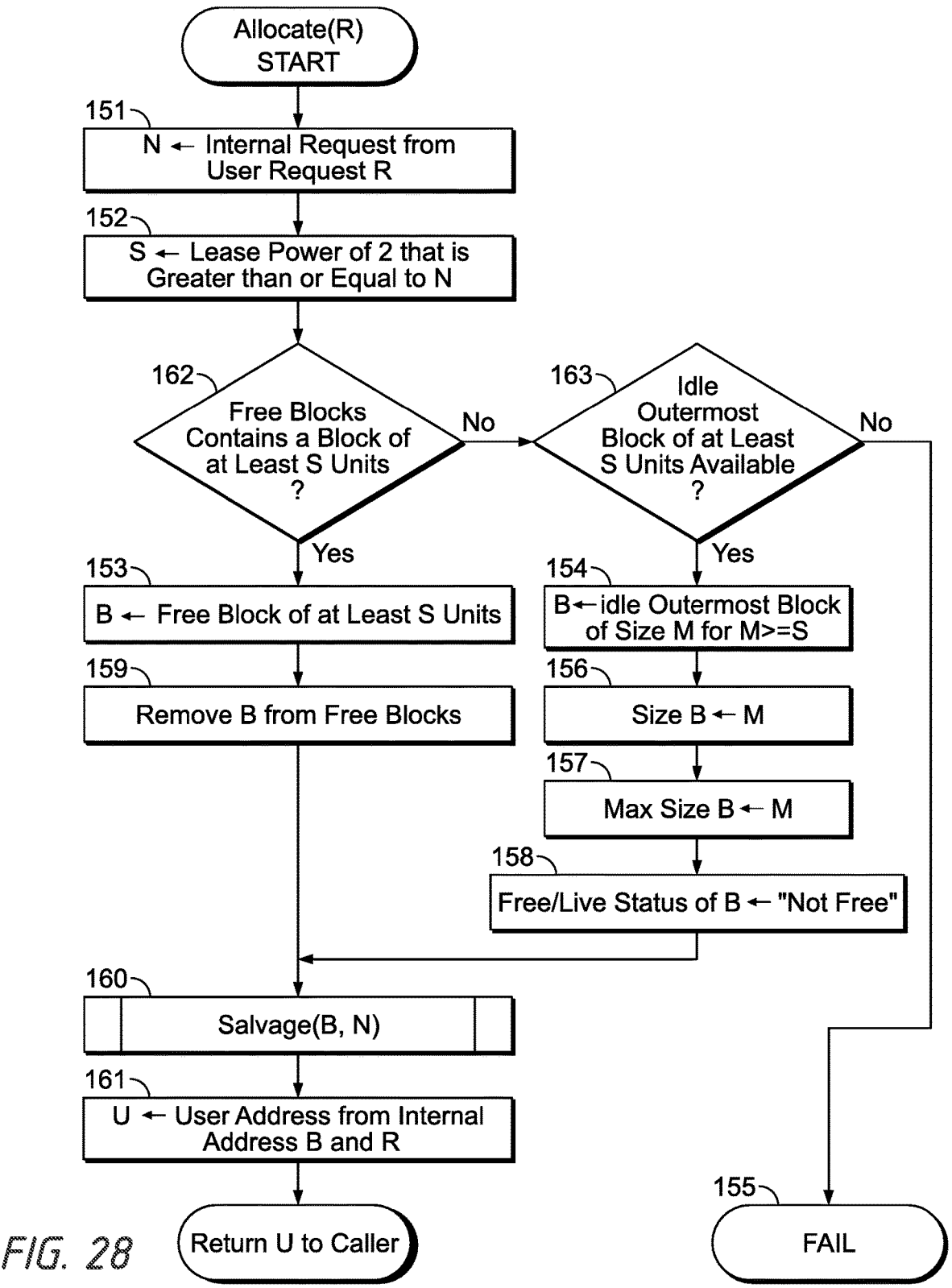
FIG. 28 is a flowchart for an allocation process of blocks of memory according to another embodiment of the subject disclosure.

Modified versions (alternate embodiments) of Merge and Allocate are shown in FIG. 27 and FIG. 28 respectively. Consider the modified version of Merge in FIG. 27 first. All operations (and their labels) from FIG. 24 have been retained. Operations (142) and (144) have been added. At the point that the test S<M (141) becomes false, the merge candidate has reached its max size. It is helpful at this point to refer to a property that we established earlier: the leftmost sub-block of an outermost block has max size equal to the size of the outermost block. What this means for us in the case before us is that if p is the address of an outermost block (144), then p is an idle outermost block because it is both leftmost (being the address of the outermost block itself), and its size has reached its max size as determined by (141). In other words, in addition to being the address of an outermost block as determined by (144), p contains no live data is not in the set of free blocks The latter condition holds because of operation (145) in the flowchart. Operation (142) relinquishes an idle outermost block in a manner determined by the embodiment.

Now consider the amended version of Allocate in figure FIG. 28.

All operations (and their labels) from FIG. 25 have been retained. Operations (163), (154), (156), (157) and (158) have been added. Here, when the test (162) fails, rather than failing directly (155), an outermost block of at least S units is obtained (154) if such an outermost block is available (163). If neither a suitable free block nor a suitable outermost block is available, the allocator fails (155); it is unable to satisfy the request.

In the case that an idle outermost block is obtained, we assume that no size, max size, or free/live status information has as yet been associated with the block. The flowchart therefore includes operations that establish these associations (156), (157), and (158). Recall that outermost blocks are always binary blocks.

Notice that the operation (154) is in fact an assignment to two variables, B and M. We might have expressed this as an assignment to a tuple <B, M>; or we might have specified that the operation associates a size with the returned block, just as we associate size and max size with blocks generally and omitted the explicit association of a size with it via the separate operation size of B←M (156). These are different ways of accomplishing the same thing.

Other amendments are possible for the management of outermost blocks. One might modify Allocate to obtain outermost blocks dynamically but opt not to relinquish them dynamically in Merge for example. Alternatively, the allocator might be "primed" with a certain number and size of outermost blocks at the outset, by putting them directly into the set of free blocks, so that performance does not stall while additional idle outermost blocks are acquired in Allocate unless memory demands exceed a certain limit. There are other possibilities besides; the Salvaging Allocator is unusually flexible in its handling of outermost blocks, because the association of a max size with a block naturally lends itself to an elegant handling of outermost blocks. embodiment-4 shows a sample embodiment that uses the above machinery to acquire and relinquish outermost blocks dynamically.

Alignment

There are two matters for attention concerning alignment:

how do we know that Salvage and Decompose honor the offset alignment restriction on binary blocks as they split blocks to create free blocks?

how can we produce address-aligned live blocks from the Salvaging Allocator, when that is required of an embodiment, given that it works in terms of offset alignment, and given that live blocks are not binary blocks in general?

Offset Alignment

To the first point: let us assume that we begin with these two invariants:

free blocks are binary blocks a live block of size N is offset-aligned to a $2^{\lceil \log 2N \rceil}$-unit boundary.

These are plainly true at the outset, when the only blocks known to the allocator are free outermost (and therefore binary) blocks, and there are no live blocks. Salvage and Decompose must maintain these invariants. Let's consider Salvage first. Salvage removes power-of-two sized sub-blocks from the end of a binary block, beginning with the largest power of two that can be removed while still maintaining enough space to satisfy the request. Referring to FIG. 21, S is the size of the block p with which Salvage begins, N is the request size, and F the size of the first block it removes from the right-hand end of p.

S and F are powers of two with F<S. Salvage creates a new block at address p+(S−F) referring to the initial value of S here. We know that the address p is offset-aligned to an S-unit boundary because it is a binary block. Moreover, (S−F) is an even multiple of F, as both S and F are even multiples of F. Therefore, the address p+(S−F) is offset-aligned to an F-unit boundary, and the free block that Salvage creates is a binary block as required (that is, it is offset-aligned to its size). When Salvage updates S to S−F, the new value of S is an even multiple of F as we saw above. In the next iteration, a smaller power of two will be used as the new value of F. It follows that the value of S at that point is an even multiple of the updated value of F, and the invariant therefore continues to hold as Salvage creates successively smaller free blocks.

The final (live) block that Salvage carves out is placed at the address of the original binary block at which Salvage began. It therefore follows that this address is offset-aligned to a $2^{\lceil \log 2N \rceil}$-unit boundary, because $2^{\lceil \log 2N \rceil}$ is no greater than the initial value of S, the free block from which Salvage begins must be at least as large as the request size. Therefore, the second invariant holds for live blocks as created by Salvage; and Salvage is the only origin of live blocks in the allocator.

In the case of Decompose, consider the forward version in FIG. 23. The live block address p0 from which Decompose begins is, by the above invariants, offset-aligned to a $2^{\lceil \log 2N \rceil}$-unit boundary. The address p is initialized from p0 and is used to create new free blocks; p is advanced by the size of each free block created. The first free block created has address p0 and size F where F is a power of two that satisfies $F < 2^{\lceil \log 2N \rceil}$. This means that the first free block is offset-aligned to an F-unit boundary and is therefore a binary block. The updated value of p, namely p0+F, is likewise offset-aligned to an F-unit boundary. The next free block created has size a smaller power of two than the first, and therefore p is adequately offset-aligned to create a binary block at the updated address p; and so on for subsequent iterations. The invariant on free block offset-alignment is thus maintained by Decompose. A similar argument holds for the backward version of Decompose, which creates the same free blocks at the same addresses as the forward version.

Note that there is no need to make an argument on behalf of Merge, because the very definition of a pair of buddies is that when merged they result in a binary block twice the size of each buddy.

Address Alignment

Suppose that an embodiment wishes for every live block to be address-aligned to $2^{\lceil \log 2N \rceil}$-unit boundary where N is the block size, or to a maximum guaranteed alignment K, whichever is smaller. The key point is that offset alignment translates into address alignment to the extent that outermost blocks are address-aligned. If every outermost block is address-aligned to at least K-unit boundary (for K a power of two), then by the invariants above, a live block will be address-aligned to the lesser of $2^{\lceil \log 2N \rceil}$ and K, where N is the size of the live block. This follows very simply from the fact that the address of a block is the address of the outermost block that contains it, added to the block's offset. The address alignment of the resulting sum is the lesser of the address alignment of the block and the alignment of the offset. K is the former and $2^{\lceil \log 2N \rceil}$ is the latter.

Small live blocks will in general be address-aligned to less than K, because the term $2^{\lceil \log 2N \rceil}$ will be less than K for these blocks but blocks for which $2^{\lceil \log 2N \rceil}$ is larger than K will be guaranteed address alignment of only K, because K is the maximum address alignment that outermost blocks are guaranteed to have.

We have described the address alignment of outermost blocks as a fixed value K, but it is never necessary or useful to address-align an outermost block to a boundary greater than its size. To align a 4096-unit outermost block to an 8192-unit boundary serves no purpose, because the largest request that can serviced from such a block is for 4096 units, and such a request is not guaranteed to have greater than 4096-unit address alignment anyway.

We will refer to K as the alignment bound. We can summarize the connection between outermost block alignment, live block alignment, and the alignment bound K as follows:

Alignment Guarantee If every outermost block is address-aligned to the lesser of K and its size, then every live block will be address-aligned to the lesser of K and $2^{\lceil \log 2N \rceil}$, where N is the size of the live block.

As a corollary:

Natural Alignment of All Live Blocks If every outermost block is address-aligned to its size, then every live block will be address-aligned to $2^{\lceil \log 2N \rceil}$, where N is the size of the live block.

In the simple case where a single outermost block is used by the allocator and that block has address zero, this condition obtains automatically and there is effectively no alignment bound. At the other extreme, if K is 1, no address alignment requirements are imposed on outermost blocks, nor are any address alignment guarantees given for live blocks.

Displaced Alignment

Figure 29:
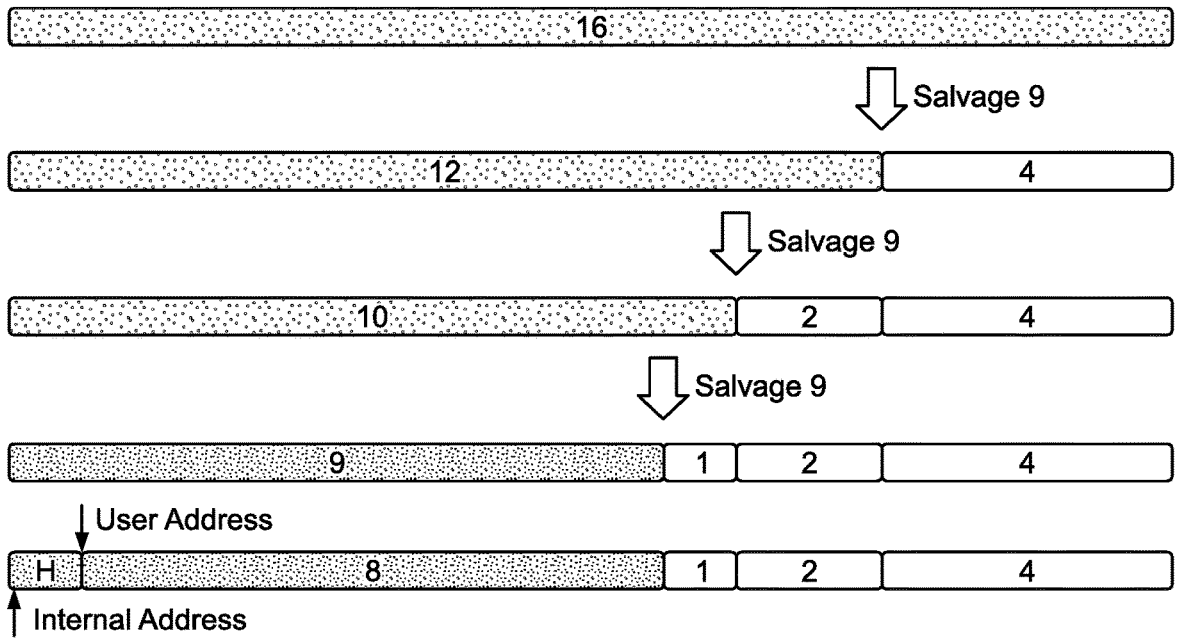
FIG. 29 is a diagrammatic view of blocks of memory under address misalignment.

If an embodiment stores size, max size, or free/live status in blocks themselves, then the address alignment we get by virtue of outermost block address alignment would seem to be lost. That is, assuming this information is stored in the first unit(s) of a block, it is the header information that gets a guaranteed address alignment. The "user data", which is held in the units following the header information, is at an aligned address plus a small constant, which is to say that it is not address-aligned at all, for practical purposes. Note moreover that there is no other address within the live block whose alignment is as high as that of the first address in the live block, so there is no possibility for the consumer of the live block to remedy this situation by using an address farther into the live block as the high-alignment point. See FIG. 29. The user requests 8 units. Operation (151) in FIG. 25 increases the request to 9 in order to accommodate a 1-unit header that is to be held in the first allocated unit. Operation (161) in FIG. 25 returns the address that is just past this header to the user. The alignment of the 16-unit starting block in row 1 of FIG. 29 has been imparted to the header information rather than to the user data.

Figure 30:
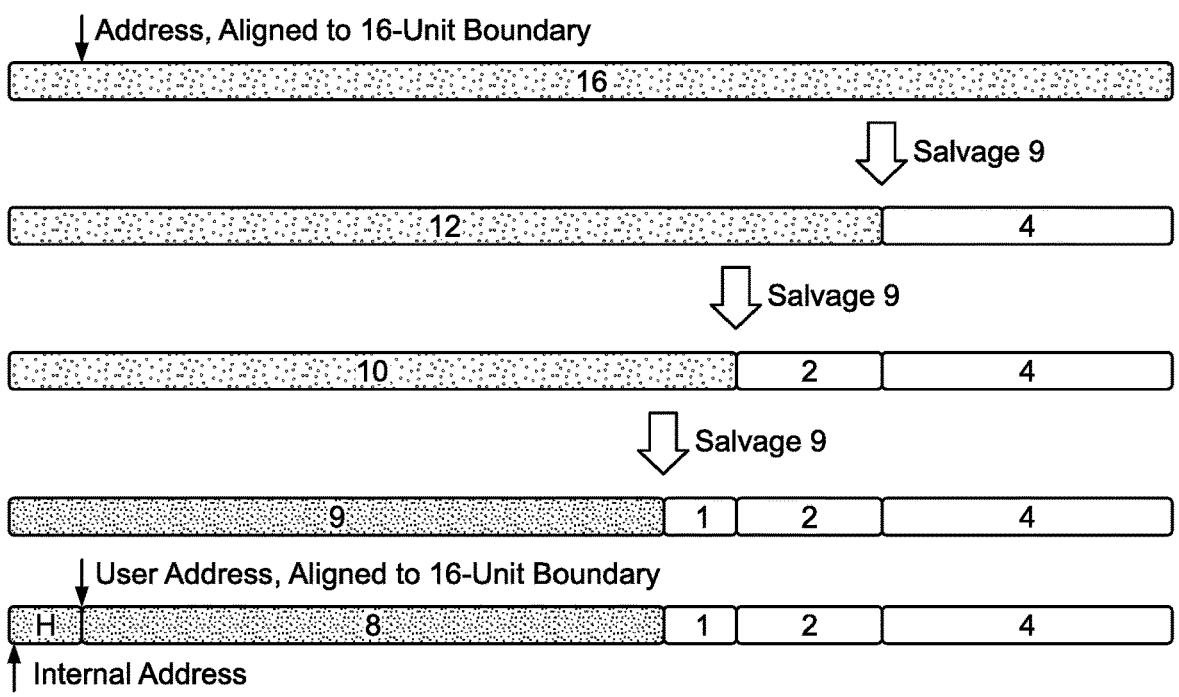
FIG. 30 is a diagrammatic view of blocks of memory from FIG. 29 re-aligned as a result of a salvage allocation process according to embodiments of the subject disclosure.

This problem is easily addressed by the Salvaging Allocator, at the cost of some external fragmentation at the level of outermost blocks. If outermost blocks are given a negative displacement that is equal to the size H of a header, then the "user data" will be automatically be address-aligned rather than headers. See FIG. 30. Instead of aligning an outermost block's base address base on a K-unit boundary, the address base+H is aligned to a K-unit boundary. The internal address in the last row of the figure is therefore H units less than the alignment point of the 16-unit block in the first row. (We have assumed here that K is at least 16 here.) This displacement applies to all binary sub-blocks of the outermost block. It might be for example in FIG. 30 that the 16-unit starting block is in fact a sub-block of a much larger outermost block, but the constant displacement of the outermost block as a whole is translated into a constant displacement of each of its binary sub-blocks.

We can take this approach one step further. It might be that user data itself will contain fixed header information within the user data area. For example, it might be that a vtable pointer will be held in the first unit of the user data area. By displacing the outermost block by the sum of the internal header as well as the user header, we can force the high-alignment address to be at a prescribed fixed position within the user data area. See FIG. 31.

Here the user data contains a fixed header V that does not require high alignment. The embodiment wishes for the 7-unit sub-block just past the user header V to be address-aligned to the lesser of lesser of $2^{log\ 2N}$ and K, where N is the request size (8 in this case) and K is the alignment bound. By displacing outermost blocks by the sum of the units required for H and V, this address alignment of the 7-units sub-block just beyond V is achieved.

Effect on the Allocator

Remarkably, to implement address alignment as described above requires no changes to the flowcharts for Salvaging Allocator. The address alignment and displacement of outermost blocks is encapsulated within operation (154) of FIG. 25. The displacement of a user address to account for an internal header is encapsulated in operation (161) of the same figure. The adjustment of a user request to an internal request in order to accommodate internal header, user header, or minimum alignment requirements is encapsulated in operations (151) of FIG. 25 and (172) of FIG. 26. Finally, the un-displacement of a user address at deallocation to recover the internal address is encapsulated in operation (173) of FIG. 26. In other words, these eventualities have already been integrated into the allocator's flowcharts.

The allocator per se is insensitive to address alignment, as it works entirely in terms of offset alignment. It is however necessary to say more about the mechanics of aligning and displacing outermost blocks, in light of the fact that an embodiment will in general be responsible for this as well as allocation and deallocation of individual requests via Allocate and Deallocate.

At this point we can summarize the performance of the Salvaging Allocator; it achieves:
  address alignment of $2l^{og2N}$ (up to an alignment bound K)
  at a designated offset D within live blocks
  for requests of arbitrary size N
  with no internal fragmentation (or internal fragmentation bounded by a constant)
  with on-the-fly coalescing
  in worst-case logarithmic time and sub-logarithmic space per allocation and deallocation where logarithmic in the final point refers to the number of address bits.

A somewhat esoteric note on the alignment of non-power-of-two blocks: not only is alignment guaranteed to be $2^{log\ 2N}$ up to a bound K, but moreover it is guaranteed that a full expanse of $2^{log\ 2N}$ units exists at the address of every live block of N units.

The reader who is familiar with vector computation will appreciate that this can sometimes be a useful boundary condition when vectorizing operations on vectors whose size is not a power of two.

Partitioning an Address Space into Outermost Blocks

Providing the above address alignment guarantee on live blocks entails
  aligning outermost blocks to the lesser of K and their size
  displacing the base addresses of outermost blocks to account for internal headers (H, above) and/or user headers (V, above)

Let us first consider the situation in which internal and user headers are not used, which is to say, base addresses of outermost blocks are not displaced.

Suppose in the simplest case that K is infinity: every outermost block is to be address-aligned to its natural size. The critical observation in this case is this:

There is a unique decomposition of any address range (starting address and length) into outermost blocks that are as large as possible while being naturally address-aligned.

Let's call p the first address in the range and N the length of the range. The largest outermost naturally address-aligned that can be created at p has size F the greatest power of 2 that divides p evenly and is less than or equal to N. We make this block an outermost block, advance p by F, reduce N by F, and repeat. Note that every address between p+1 and p+F−1 inclusive is evenly divisible only by a smaller power of 2 than F; looking at such an address as a binary number, it will have a 1 bit at some position between 0 and $log_2$ F−1.

Figure 32:
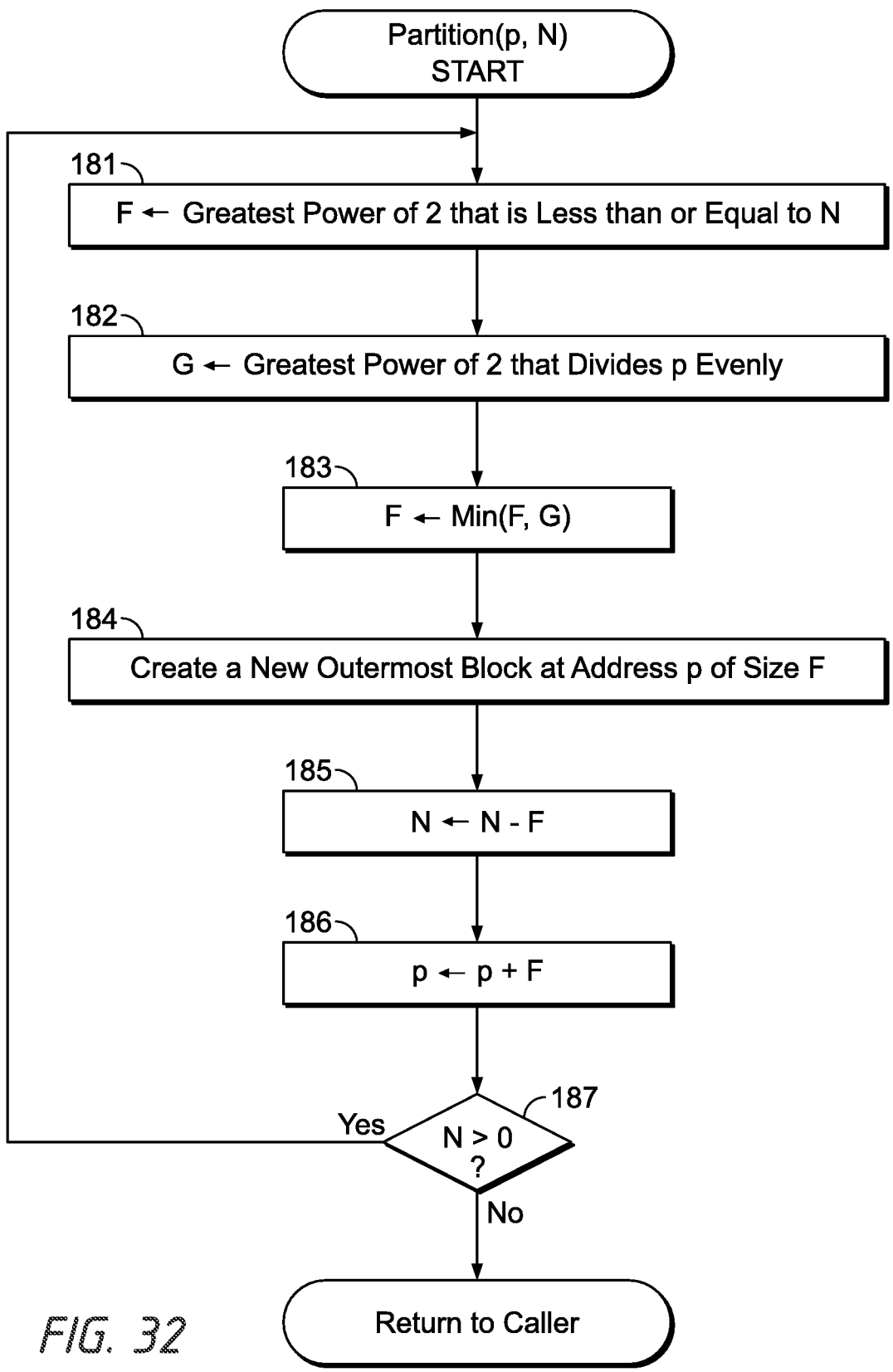
FIG. 32 is a flowchart of a process of partitioning alignment for outermost blocks of memory according to embodiments of the subject disclosure.

So, there is no possibility that we could have created a larger naturally address-aligned block at these addresses. On the other hand, we plainly cannot create a larger naturally address-aligned block at address p. So, the procedure gives an optimal result for each p that it considers in turn. See FIG. 32.

The procedure Partition is shown in flowchart form. It takes an address range in the form of a first address p and a length N and creates outermost blocks by subdividing the address range into naturally address-aligned binary sub-blocks. F is set to the greatest power of 2 that divides p evenly and is less than or equal to N at (183). The operation (184) that creates an outermost block may do several different things. It might for example make the block available to operation (154) in FIG. 28. It might alternatively associated size and max size F with the block and make the block free, so that it is available to operation (162) of Allocate. This is a question of an embodiment's overall strategy for managing outermost blocks.

Partition effectively goes through two phases. In the first phase, the value of F rises from iteration to iteration, as the value of N is too large to affect its action. In other words, F equals G during this phase. Every time an outermost block is created, the address p of the block is aligned to an G-unit boundary and has size G. The next address p+G is to (at least) a 2G-unit boundary. This causes G and thus F to rise at the next iteration. This continues until N falls to the point where it is a factor in the min expression at (183). Once Partition approaches the end of the block, N becomes a constraint. At this point, smaller and smaller outermost blocks are created, until finally N is exhausted.

Figure 33:
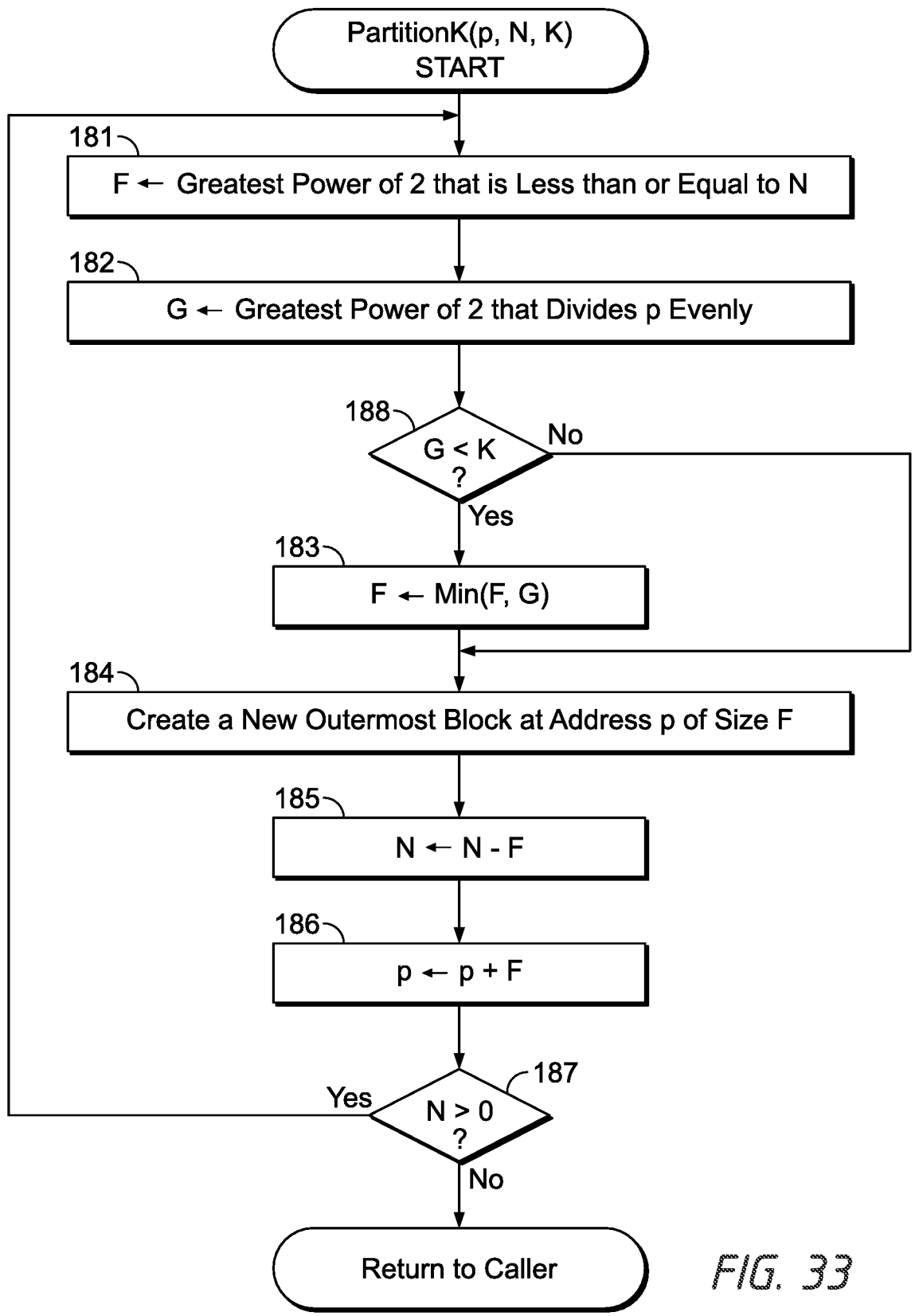
FIG. 33 is a flowchart of a process of partitioning blocks of memory according to another embodiment of the subject disclosure.

Now see FIG. 33.

Here the procedure PartitionK is shown. It is a slightly modified version of Partition that includes the parameter K that bounds the maximum alignment guarantee provided by the allocator. All operations (and their labels) from FIG. 24 have been retained. Operation (188) has been added.

When p is (address-)aligned to a boundary G less than K (188), then the size F of the outermost block created at (184) must be constrained to be no larger than G, as it is in Partition. When however, the address alignment of p is greater than or equal to K, there is no need to constrain the size of the new outermost block by the address alignment of p: the address is already as aligned as is useful, in light of the fact that K is (by definition) the upper bound on the alignment guarantee provided by the allocator for live blocks. In this case the operation at (183) is skipped, and the size of the outermost block that is created is based exclusively on the remaining size N of the address range.

Now recall our discussion about the two "phases" of Partition, rising and falling outermost block sizes. PartitionK begins in the same way: the value of N is too large to affect the computation, and the value of F rises. Once however the address alignment of p reaches K, the algorithm switches gears and is only constrained by the value of N, no matter how large the latter.

To visualize this, imagine that the first address in the address range we are working on is 0xABC5 (p), and that the length of the address space is 0x1003 (N). Suppose K is 8. In other words, the largest address alignment guarantee we require of the allocator is 8 units. When PartitionK runs, the first value of G is 1, and an outermost block of 1 unit is created. This leaves p at the value 0xABC6 and N as 0x1002. The next G is 2, an outermost block of 2 units is created, p becomes 0xABD8 and N becomes 0x1000. At this point, K is no longer a factor—p is address-aligned to a K-unit boundary, and the condition at (188) becomes true. A single outermost block of length 0x1000 is created at address 0xABD8 and PartitionK is done.

To put this less formally, PartitionK first drives the alignment of p up to a K-unit boundary, and thereafter ignores address alignment altogether, chopping off the biggest binary blocks it can in the manner of Decompose, until N becomes small enough that PartitionK is forced to create small "remainder" blocks at the right-hand end of the address space.

What's the upshot of all this in terms of fragmentation? The alignment requirements that are imposed on the allocator in order to achieve a maximum alignment guarantee of K do not entail unused and therefore wasted space per se when no internal headers are used. The value of K does however cause small outermost blocks to be created, to the extent that the address range itself is misaligned, and those blocks represent hard boundaries to the allocator. This is "external fragmentation" in the sense that there may be enough total free storage to satisfy a request and yet the allocator might fail because that storage is not in the form of a single free block due to Partition or PartitionK. But in this case the failure is due to the alignment guarantee K that the embodiment has imposed on the address space.

In practice it is much more likely that the external fragmentation that impacts the allocator will be that which occurs simply because the sequence of allocations and deallocations presented to the allocator leaves live blocks scattered about the address space and thus leaves large outermost blocks cut into smaller pieces.

Partitioning for Displaced Alignment

Figure 31:
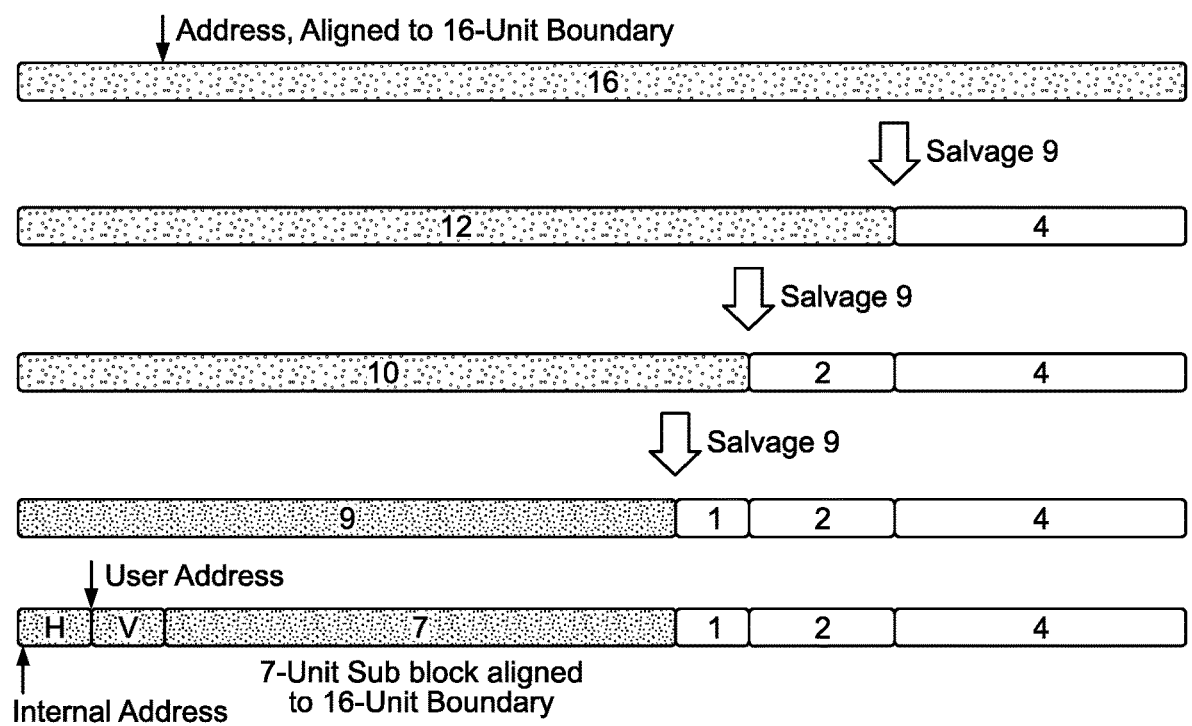
FIG. 31 is a diagrammatic view of blocks of memory from FIG. 30 with user data aligned according to embodiments of the subject disclosure.

Now let us turn to the case where base addresses of outermost blocks must be displaced to provide alignment guarantees for the "user data" offset within a live block, as per FIG. 31.

It is relatively simple to modify Partition and PartitionK to account for this situation. We will show the modification only for PartitionK. Let D be the displacement that will be applied to all outermost blocks. D is H+V, where H is the size of any internal header and V is the size of any user header. The alignment point within live blocks will be at offset H+V, relative to the internal address for a block, and at offset V, relative to the user address for the same block. See FIG. 31.

Figure 34:
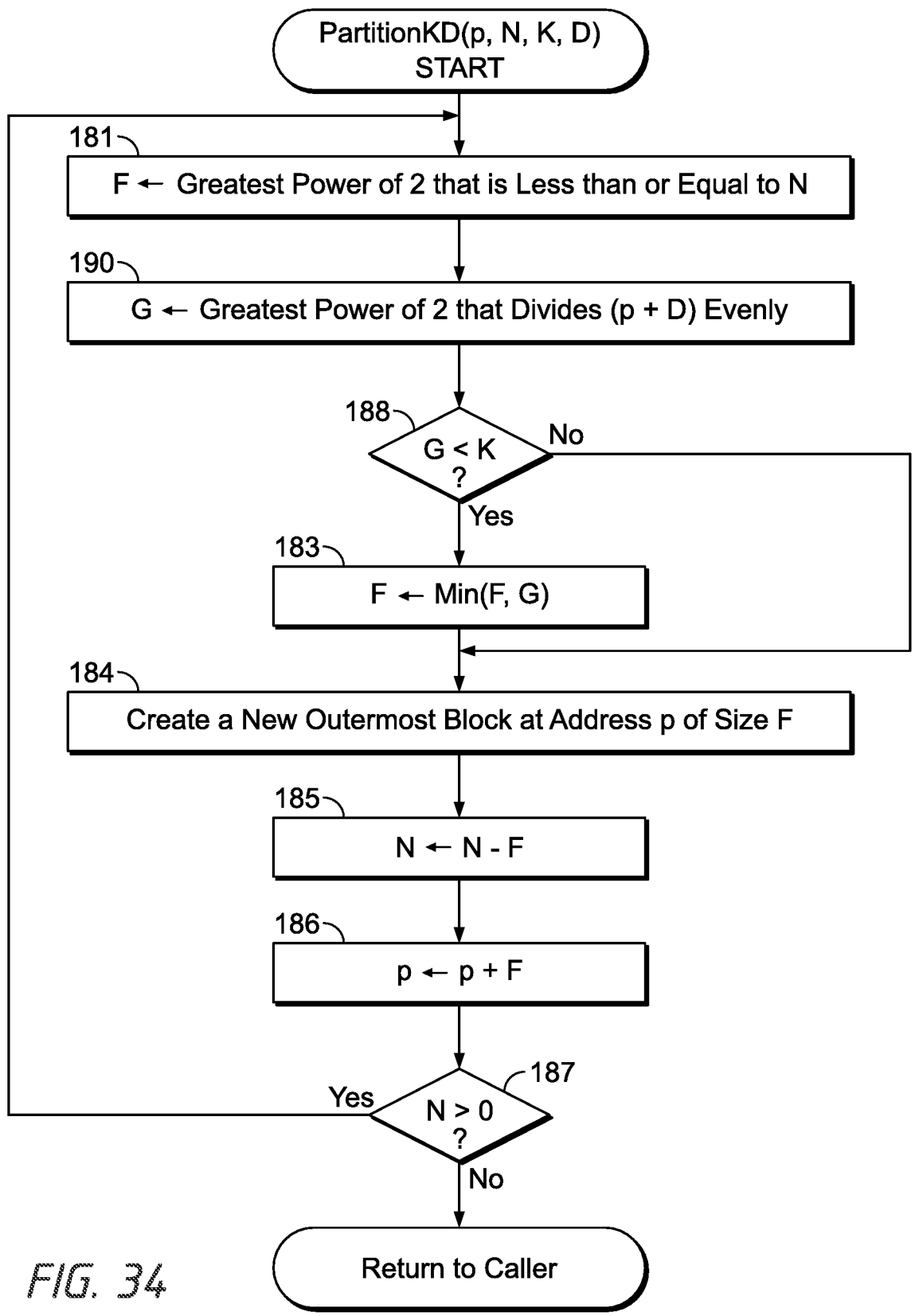
FIG. 34 is a flowchart of a process of partitioning blocks of memory according to yet another embodiment of the subject disclosure.

Outermost block addresses will be D units less than their alignment points. In other words, if the block address is B then it is the address B+D that PartitionK must align as it creates new outermost blocks. To accomplish this, we need make only a few modifications to FIG. 33. See FIG. 34.

The routine PartitionKD now takes four parameters: the base address of the address range p, the length of the address range N, the alignment bound K, and the displacement D. Operations (182) has been replaced by operation (190). In PartitionKD, G is calculated using p+D (190) rather than p (182). The alignment of this address constrains the size of the new outermost block that is created at (184), because this is the offset that the embodiment has chosen (via D) for high alignment within live blocks. We call the address p+D the alignment point of a live block. It is the address for which the allocator provides an alignment guarantee.

As with Partition and PartitionK, PartitionKD will in general create a number of small outermost blocks at both ends of the address space as it first increases the alignment of p, and then decreases it as it nears the end of the address space. PartitionKD however aggravates this condition in the sense that if it is presented with a high-alignment address p, it effectively mis-aligns it by adding D to it, (and D is expected to be small relative to K in general), then proceeds to carve off small outermost blocks until p+D once again reaches alignment K (or is stopped short by N). Note that this situation (fragmentation of the first K-D units of the address range) is likely to be much more common when using a nonzero value for D than with Partition and PartitionK, because it will often be the case that the address range made available for allocation has some degree of alignment.

This highlights an important role played by K: it acts not only as a bound on alignment guarantees, but it simultaneously bounds the number of units that are fragmented (chopped into small outermost blocks) by the mis-alignment of outermost blocks due to D. In one sense, the K-D units are not wasted: they are available for small requests, and in some situations that will adequate to allow them to be put to use. The "waste" associated with them is in the fact that, like all outermost blocks, they cannot be merged to a size larger than their initial size. This means that they can never be used to service large requests.

To put concrete numbers on this: suppose that K is 4096, e.g., K is the size of a page and alignment to a page boundary is the highest alignment of live blocks that is useful to a particular embodiment. Suppose further that D is 16, e.g., there is an 8-unit internal header and an 8-unit user header. Suppose yet further that the address space we are partitioning is aligned to a page boundary. In this case, the first 4080 units of the address space will be split into outermost blocks of up to 2048 units. Beginning at offset 4080, the address space will be split into outermost blocks that are as large as possible in light of the (remaining) length of the address space, i.e., N 4080 units.

We can augment our earlier definitions of the alignment guarantee provided by the allocator as follows: Displaced Alignment Guarantee If the address B+D within every outermost block B is aligned to the lesser of K and the size of B, then the address p+D within every live block p will be aligned to the lesser of $2^{log\ 2N}$ and K, where N is the size of p.

As a corollary:

Displaced Natural Alignment of All Live Blocks If the address B+D within every outermost block B is aligned to the size of B, then the address p+D within every live block p will be aligned to $2^{log\ 2N}$, where N is the size of the live block.

To appreciate how useful this can be, consider a programming language implementation that wishes to place a vtable pointer in the first units of a live block. By setting D to the sum of the size of the internal headers used by the allocator and the size of a vtable pointer, high alignment is guaranteed for address just beyond the vtable pointer. That address might contain for example a vector of floating point numbers that is to be subject to vectorization. The declaration might look like this (expressing the idea in C++):

```
class C
{
    virtual ~C( ); // this class has a vtable
    float A[887]; // we want A highly aligned
};
```

By using D to displace the alignment appropriately, we can cause A to have alignment guaranteed to up to K or choose K to be so large that there is no constraint on the alignment guarantee. This means that vectorization of A can be unconditional in respect to the alignment of A the alignment will be guaranteed. This works even if A is declared as a variable-length array (A[ ]); the alignment will reflect the actual size of A and will rise (up to the bound K) as the length of A rises.

Minimum Size for Free Blocks

Note that the addresses B+D and p+D will be beyond the end of the block and not "within" the block, for blocks whose size is D or less. The properties above hold nevertheless, except for the "within" qualification; that is, the addresses B+D and p+D are nevertheless guaranteed to be aligned as above, and from this guarantee one can determine the minimum alignment guarantee for the base address B or p, i.e., the alignment of header information. It will be necessary in general for an embodiment to choose D such that the headers get whatever minimal alignment they require; this alignment will be guaranteed as a side-effect of the alignment of the point p+D. This case however raises an important consideration concerning free blocks and the three partitioning operations above: when free blocks contain in-band headers, i.e., hold header information in the units of the free block itself, then there may be a minimum free block size M that is greater than one unit. Partition et al are unaware of header information, they leave this matter to operation (184) that creates a new free block. Operation (184) however will fail if asked to create a free block that is smaller than M in certain embodiments.

There are two ways around this problem. One solution is to modify operation (184) to do nothing when F is less than M. That simply leaves a small unused whole in the address space.

The second way is to observe that if p and N are both multiples of M, then Partition, PartitionK, and PartitionKD will never attempt to create a free block of less than M units. Recalling our discussion of the "two phases" in which partitioning works, such a small block will not be created in the first phase because p is already aligned to an M-unit boundary; and it will not be created in the second phase because N is similarly aligned. In other words, both the beginning and the end of the address range are aligned to an M-unit boundary. In effect, the first solution implements the second solution by eliding useless small blocks at the beginning and end of the address space.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "user interface," "module," or "system." Furthermore, aspects of the disclosed technology may take the form of a computer program product embodied in one or more computer readable media having computer readable program code embodied thereon.

Aspects of the disclosed invention are described above (and/or below) with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a computer system/server, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A computer system/server may represent for example the machine providing functions related to controlling operations related to managing data storage and in particular to the processes described above with respect to merging, salvaging, allocating, deallocating, and decomposition.

The components of the computer system/server may include one or more processors or processing units, a system memory, and a bus that couples various system components including the system memory to the processor. The computer system/server may be for example, personal computer systems, tablet devices, mobile telephone devices, server computer systems, handheld or laptop devices, multiprocessor systems, microprocessor-based systems, set top boxes, programmable consumer electronics, network PCs, dedicated network computers, and distributed cloud computing environments that include any of the above systems or devices, and the like. The computer system/server may be described in the general context of computer system executable instructions, such as program modules, being executed by the computer system. The computer system/server and auditing process(es) may be practiced in distributed cloud computing environments where tasks are performed by remote processing devices that are linked through a communications network. In a distributed cloud computing environment, program modules may be located in both local and remote computer system storage media including memory storage devices.

Figure 35:
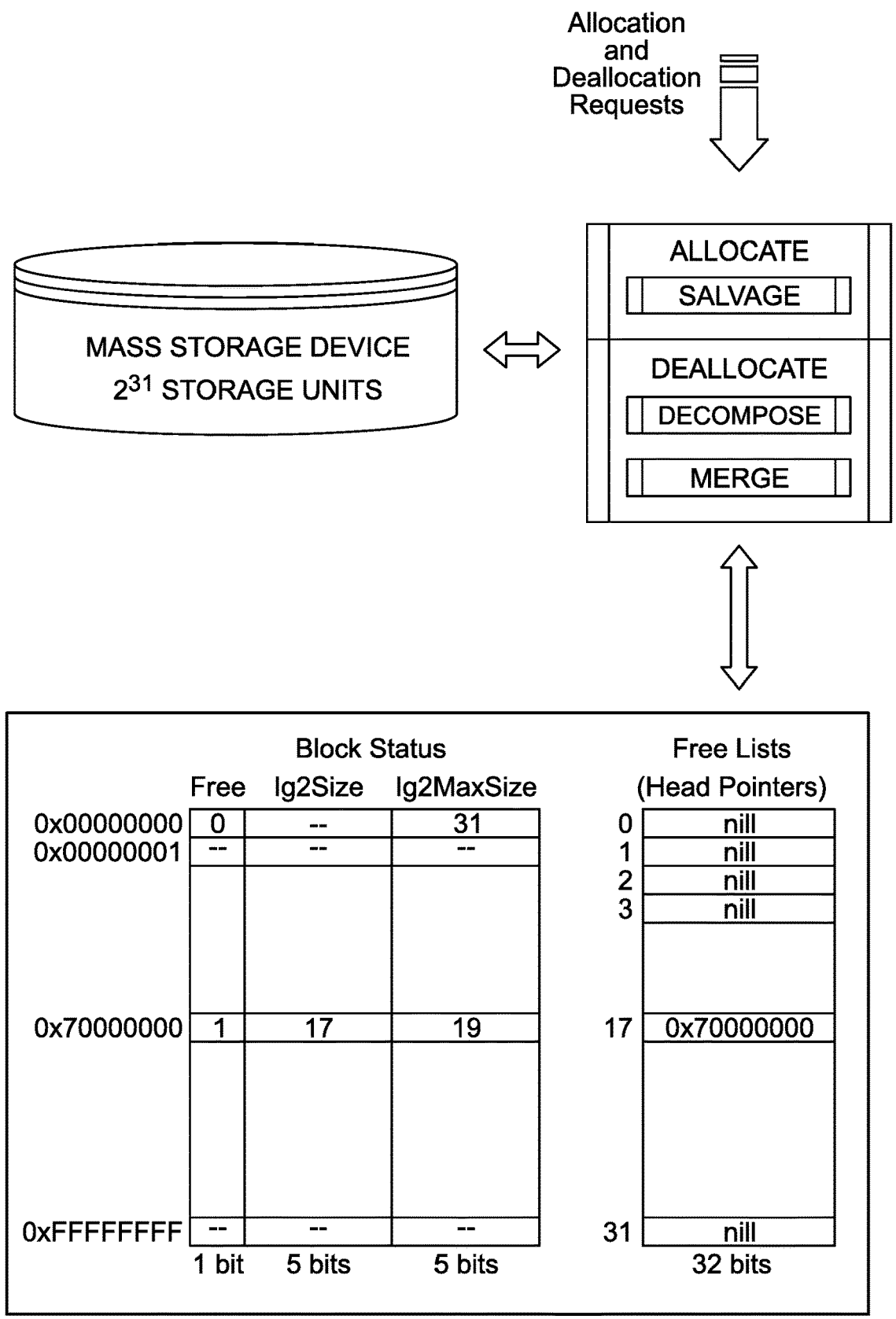
FIG. 35 is a block diagram of a memory system operating under embodiments of the subject disclosure.

The computer system/server may typically include a variety of computer system readable media. Such media could be chosen from any available media that is accessible by the computer system/server, including non-transitory, volatile and non-volatile media, removable and non-removable media. FIG. 35 shows an example of a portion of a computer system/server including a data storage device (as media being read or written to), whose memory blocks are managed by embodiments of the processes described above. The system memory could include one or more computer system readable media in the form of volatile memory, such as a random-access memory (RAM) and/or a cache memory. By way of example only, a storage system can be provided for reading from and writing to a non-removable, non-volatile magnetic media device. The system memory may include at least one program product having a set (e.g., at least one) of program modules that are configured to carry out the functions of merge, salvage, allocation, deallocation and decompose as described above.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A process performed by a computing device for deallocating blocks of memory, comprising:
   receiving a request to deallocate a previously allocated block of memory of (x) unit size;
   determining whether a binary buddy block is free;
   starting with a last power of 2 units block of memory released,
      merging the last power of 2 units block of memory with the binary buddy block to form a merged power of 2 units block of memory when the binary buddy block is free and has the same size as the released power of 2 units block of memory, and
      not merging an adjacent binary buddy block with the last power of 2 units block of memory in response to the binary buddy block being not free or having size not equal to that of the last power of 2 units block of memory;
   associating a max size with each merged power of 2 units block of memory;
   adjusting a maximum unit size value of the binary buddy block when it is not merged with the last power of 2 units block of memory and the address of the binary buddy block is greater than the address of the last power of 2 units block of memory; and
   successively releasing decreasing power of 2 units blocks of memory from the previously allocated block of memory until the entire previously allocated block has been released.

2. The process of claim 1, further comprising: associating a max size with each power of 2 units block of memory released.

3. The process of claim 1, further comprising:
   repeating the merging step for each merged power of 2 units block of memory, while the size of the power of 2 units block of memory has a size less than its max size.

4. The process of claim 1, further comprising determining the binary buddy block as the next power of 2 units block of memory for merging at its new, merged size, when the binary buddy block is merged with the last power of 2 units block of memory and the address of the binary block is less than the address of the last power of 2 units block of memory.

5. The process of claim 1, further comprising determining the last power of 2 units block of memory as the next power of 2 units block of memory for merging at its new, merged size, when the binary buddy block is merged with the last power of 2 block and the address of the binary block is greater than the address of the last power of 2 units block of memory.

* * * * *